US011229095B2

(12) United States Patent
Mohammed et al.

(10) Patent No.: US 11,229,095 B2
(45) Date of Patent: Jan. 18, 2022

(54) ELECTROMAGNETIC WAVE FOOD PROCESSING SYSTEM AND METHODS

(71) Applicant: CAMPBELL SOUP COMPANY, Camden, NJ (US)

(72) Inventors: Rasheed Mohammed, Sicklerville, NJ (US); Mark Robert Watts, Marlton, NJ (US); Alexander Louis Augugliaro, Oaklyn, NJ (US); Scott Wayne Keller, Medford, NJ (US)

(73) Assignee: Campbell Soup Company, Camden, NJ (US)

( * ) Notice: Subject to any disclaimer, the term of this patent is extended or adjusted under 35 U.S.C. 154(b) by 376 days.

(21) Appl. No.: 14/969,521

(22) Filed: Dec. 15, 2015

(65) Prior Publication Data

US 2016/0183333 A1 Jun. 23, 2016

Related U.S. Application Data

(60) Provisional application No. 62/093,244, filed on Dec. 17, 2014.

(51) Int. Cl.
*H05B 6/78* (2006.01)
*H05B 6/64* (2006.01)
(Continued)

(52) U.S. Cl.
CPC ............... *H05B 6/78* (2013.01); *A23L 3/01* (2013.01); *A23L 3/0155* (2013.01); *A23L 3/045* (2013.01);
(Continued)

(58) Field of Classification Search
None
See application file for complete search history.

(56) References Cited

U.S. PATENT DOCUMENTS 3,335,253 A   8/1967   Jeppson
3,398,251 A * 8/1968   Jeppson ................. A23L 3/01
                                                    219/686
(Continued)

FOREIGN PATENT DOCUMENTS

AT        504716       7/2008
AU      2003208568     7/2003
(Continued)

OTHER PUBLICATIONS

"International Preliminary Reporton Patentability," for PCT Application No. PCT/US2015/066140 dated Jun. 29, 2017 (8 pages).
(Continued)

*Primary Examiner* — Ibrahime A Abraham
*Assistant Examiner* — Gyounghyun Bae
(74) *Attorney, Agent, or Firm* — Pauly, DeVries Smith & Deffner LLC

(57) ABSTRACT

Embodiments herein include processing systems for food products and related methods. In an embodiment, a food processing system is included with a continuous processing channel divided into a come-up chamber, a main electromagnetic wave (such as microwave) heating chamber, and a cool-down chamber. The continuous processing channel can define at least two separate portions oriented for vertical product movement. In various embodiments, the come-up chamber, the main electromagnetic wave heating chamber, and the cool-down chamber are at least partially filled with liquid. The system can further include a product conveyor mechanism to convey food products to be processed continuously along a conveyance path passing from the come-up chamber through the main electromagnetic wave heating chamber and to the cool-down chamber. The system can further include an electromagnetic wave energy emitting apparatus configured to emit electromagnetic wave energy (Continued)

into the main heating chamber. Other embodiments are also included herein.

18 Claims, 16 Drawing Sheets

(51) Int. Cl.
  *H05B 6/80* (2006.01)
  *A23L 3/015* (2006.01)
  *A23L 3/04* (2006.01)
  *A23L 3/01* (2006.01)

(52) U.S. Cl.
  CPC ........... *H05B 6/6402* (2013.01); *H05B 6/782* (2013.01); *H05B 6/804* (2013.01)

(56) References Cited

U.S. PATENT DOCUMENTS

| | | |
|---|---|---|
| 3,737,608 A | 6/1973 | Nagao et al. |
| 3,809,844 A | 5/1974 | Stenstrom |
| 3,974,353 A * | 8/1976 | Goltsos ................. A47J 37/044 219/700 |
| 4,004,122 A * | 1/1977 | Hallier ................... B01J 19/126 219/697 |
| RE30,310 E * | 6/1980 | Stenstrom ................. A23L 3/01 219/700 |
| 4,229,886 A * | 10/1980 | Durant ................... F26B 5/041 219/686 |
| 4,736,832 A * | 4/1988 | Rinio ................... B65G 17/126 198/712 |
| 4,885,897 A * | 12/1989 | Gryouda ............... B65B 31/041 426/396 |
| 4,962,298 A * | 10/1990 | Ferrari ...................... A23L 3/01 219/697 |
| 4,999,471 A * | 3/1991 | Guarneri ................... A23L 3/01 219/684 |
| 5,119,720 A | 6/1992 | Rodriguez |
| 5,160,819 A * | 11/1992 | Ball ......................... A21B 2/00 219/700 |
| 5,325,765 A | 7/1994 | Sylvan et al. |
| 5,360,965 A * | 11/1994 | Ishii ........................ H05B 6/64 219/705 |
| 5,554,856 A | 9/1996 | Bidnyy et al. |
| 5,558,800 A * | 9/1996 | Page ......................... H05B 6/72 219/695 |
| 5,605,996 A | 2/1997 | Chuu et al. |
| 5,641,057 A * | 6/1997 | Chorlton ................ B65G 47/58 198/708 |
| 5,750,966 A * | 5/1998 | Ruozi ..................... A23L 3/003 219/686 |
| 5,766,002 A * | 6/1998 | Silvestrini ............... A23L 3/362 432/121 |
| 5,834,744 A | 11/1998 | Risman |
| 5,897,807 A * | 4/1999 | Edgar ...................... A21B 1/48 219/700 |
| 5,976,592 A | 11/1999 | Polato et al. |
| 5,985,339 A | 11/1999 | Kamarei |
| 6,009,993 A * | 1/2000 | Turcheck, Jr. ........ B65G 17/126 198/708 |
| 6,034,362 A | 3/2000 | Alton et al. |
| 6,039,991 A | 3/2000 | Ruozi |
| 6,075,422 A | 6/2000 | Harris et al. |
| 6,097,015 A * | 8/2000 | McCullough ............. A61L 2/12 219/686 |
| 6,171,633 B1 | 1/2001 | Dulebohn et al. |
| 6,246,040 B1 | 6/2001 | Gunn et al. |
| 6,268,596 B1 | 7/2001 | Lauf et al. |
| 6,274,858 B1 | 8/2001 | Alton et al. |
| 6,303,166 B1 | 10/2001 | Kolbe et al. |
| 6,323,471 B1 | 11/2001 | Yagi et al. |
| 6,534,105 B2 | 3/2003 | Kartchner et al. |
| 6,546,646 B1 * | 4/2003 | Thomas ................... F26B 3/347 219/707 |
| 6,576,309 B2 | 6/2003 | Dalgewicz, III et al. |
| 6,638,475 B1 | 10/2003 | Lagunas-Solar et al. |
| 6,657,173 B2 | 12/2003 | Kolbe et al. |
| 6,706,218 B2 | 3/2004 | Lucht et al. |
| 6,768,089 B2 | 7/2004 | Minobe et al. |
| 6,868,136 B2 | 3/2005 | Hansen et al. |
| 6,914,226 B2 | 7/2005 | Ottaway et al. |
| 6,945,386 B2 * | 9/2005 | Bierschenk .......... B65G 17/123 198/703 |
| 6,960,747 B2 | 11/2005 | Risman et al. |
| 6,978,212 B1 | 12/2005 | Sunshine et al. |
| 7,080,730 B2 * | 7/2006 | Ours ..................... B65G 17/126 198/550.7 |
| 7,081,636 B2 | 7/2006 | Moruzzi et al. |
| 7,119,313 B2 | 10/2006 | Tang et al. |
| 7,208,710 B2 | 4/2007 | Gregoire et al. |
| 7,227,297 B2 | 6/2007 | Srinivasan-Rao et al. |
| 7,270,842 B1 | 9/2007 | Lanier et al. |
| 7,328,708 B2 | 2/2008 | Malak et al. |
| 7,470,876 B2 | 12/2008 | Drozd et al. |
| 7,477,993 B2 | 1/2009 | Sunshine et al. |
| 7,520,667 B2 | 4/2009 | Påhlsson et al. |
| 7,700,039 B2 | 4/2010 | Nagatsu et al. |
| 7,776,415 B2 | 8/2010 | Inaba et al. |
| 7,781,745 B2 | 8/2010 | Rogers et al. |
| 7,812,292 B2 | 10/2010 | Richardson et al. |
| 7,863,997 B1 | 1/2011 | Alton et al. |
| 7,915,376 B2 | 3/2011 | Pecorini et al. |
| 7,993,603 B2 | 8/2011 | Amedeo et al. |
| 8,044,171 B2 | 10/2011 | Buhler et al. |
| 8,084,135 B2 | 12/2011 | Nichols et al. |
| 8,158,226 B2 | 4/2012 | Shibata et al. |
| 8,207,479 B2 | 6/2012 | Ben-Shmuel et al. |
| 8,216,623 B2 | 7/2012 | Anand et al. |
| 8,343,437 B2 | 1/2013 | Patel et al. |
| 8,372,350 B2 | 2/2013 | Amedeo et al. |
| 8,389,916 B2 | 3/2013 | Ben-Shmuel et al. |
| 8,575,525 B2 | 11/2013 | Mackay et al. |
| 8,586,899 B2 | 11/2013 | Mackay et al. |
| 8,640,609 B2 | 2/2014 | De Heij et al. |
| 8,661,970 B2 | 3/2014 | Shackelford et al. |
| 8,679,401 B2 | 3/2014 | Neuber et al. |
| 8,742,305 B2 | 6/2014 | Coronel et al. |
| 8,759,729 B2 | 6/2014 | Ben-Shmuel et al. |
| 8,878,109 B2 | 11/2014 | Mackay et al. |
| 8,941,040 B2 | 1/2015 | Ben-Shmuel et al. |
| 8,956,673 B2 | 2/2015 | Alvarado et al. |
| 8,981,270 B2 | 3/2015 | Tang et al. |
| 8,987,644 B2 * | 3/2015 | Mori ..................... H05B 6/6408 219/690 |
| 9,040,883 B2 | 5/2015 | Ben-Shmuel et al. |
| 9,066,376 B2 | 6/2015 | Kimrey, Jr. et al. |
| 9,078,298 B2 | 7/2015 | Ben-Shmuel et al. |
| 9,089,623 B2 | 7/2015 | Michalik |
| 9,120,587 B2 | 9/2015 | Pesce et al. |
| 9,125,958 B2 | 9/2015 | Stull, Jr. et al. |
| 9,144,117 B2 | 9/2015 | Kimrey, Jr. et al. |
| 9,167,633 B2 | 10/2015 | Damari et al. |
| 9,179,505 B2 | 11/2015 | Kimrey, Jr. et al. |
| 9,271,338 B2 | 2/2016 | Kimrey, Jr. et al. |
| 9,301,345 B2 | 3/2016 | Kimrey, Jr. et al. |
| 9,307,784 B2 | 4/2016 | Amedeo et al. |
| 9,357,589 B2 | 5/2016 | Kimrey, Jr. et al. |
| 9,357,590 B2 | 5/2016 | Kimrey, Jr. et al. |
| 9,370,052 B2 | 6/2016 | Kimrey, Jr. et al. |
| 9,380,650 B2 | 6/2016 | Kimrey, Jr. et al. |
| 9,380,651 B2 | 6/2016 | Kimrey, Jr. et al. |
| 9,433,692 B2 | 9/2016 | Hyde et al. |
| 9,440,795 B2 | 9/2016 | Mackay |
| 9,585,408 B2 | 3/2017 | Hyde et al. |
| 9,592,313 B2 | 3/2017 | Stull, Jr. et al. |
| 9,615,593 B2 | 4/2017 | Simunovic et al. |
| 9,622,298 B2 | 4/2017 | Kimrey, Jr. et al. |
| 9,642,195 B2 | 5/2017 | Kimrey, Jr. |
| 9,681,500 B2 | 6/2017 | Kimrey, Jr. |
| 9,757,485 B2 | 9/2017 | Papadopoulos et al. |
| 2001/0035198 A1 | 11/2001 | Carawan et al. |
| 2003/0211618 A1 | 11/2003 | Patel et al. |
| 2004/0063806 A1 | 4/2004 | Kaarnakari et al. |

(56) References Cited

U.S. PATENT DOCUMENTS

| | | | |
|---|---|---|---|
| 2004/0104221 A1 | 6/2004 | Kono et al. | |
| 2004/0131519 A1* | 7/2004 | Amedeo | A23L 3/04 422/308 |
| 2004/0134905 A1* | 7/2004 | Noda | H05B 6/725 219/749 |
| 2004/0137078 A1* | 7/2004 | Najafi | A01N 59/00 424/661 |
| 2004/0169002 A1 | 9/2004 | White-Wooten et al. | |
| 2004/0261620 A1 | 12/2004 | Thompson et al. | |
| 2005/0074535 A1 | 4/2005 | Dulebohn et al. | |
| 2006/0096977 A1* | 5/2006 | Ripley | H05B 6/6494 219/690 |
| 2006/0120914 A1* | 6/2006 | Salda | A61L 2/12 422/21 |
| 2006/0177554 A1* | 8/2006 | Rivero-Jimenez | A23L 7/117 426/523 |
| 2006/0188624 A1 | 8/2006 | Yahara et al. | |
| 2006/0234333 A1 | 10/2006 | Matuschek et al. | |
| 2007/0075072 A1* | 4/2007 | Roussy | H05B 6/704 219/695 |
| 2007/0160735 A1* | 7/2007 | Stillman | A23L 2/38 426/590 |
| 2008/0003238 A1 | 1/2008 | Sharafabadi et al. | |
| 2008/0145483 A1 | 6/2008 | Berrios et al. | |
| 2008/0226855 A1 | 9/2008 | Shang et al. | |
| 2008/0249247 A1 | 10/2008 | Shang et al. | |
| 2009/0045746 A1 | 2/2009 | Hanna et al. | |
| 2009/0283517 A1* | 11/2009 | Mackay | H05B 6/782 219/700 |
| 2010/0059509 A1* | 3/2010 | Imai | H05B 6/72 219/690 |
| 2010/0072194 A1 | 3/2010 | Mackay et al. | |
| 2010/0126988 A1* | 5/2010 | Mackay | A23L 3/01 219/700 |
| 2010/0178401 A1* | 7/2010 | Van Appeldoorn | B65B 55/18 426/392 |
| 2010/0187224 A1 | 7/2010 | Hyde et al. | |
| 2011/0044848 A1 | 2/2011 | Wright et al. | |
| 2011/0123689 A1* | 5/2011 | Luckhardt | H05B 1/0263 426/231 |
| 2011/0179754 A1 | 7/2011 | Utz et al. | |
| 2011/0272861 A1 | 11/2011 | Humele | |
| 2011/0290789 A1 | 12/2011 | Matsuzawa et al. | |
| 2012/0103978 A1* | 5/2012 | Longo | H05B 6/70 219/756 |
| 2012/0241443 A1 | 9/2012 | Tang et al. | |
| 2012/0297990 A1 | 11/2012 | Sonder et al. | |
| 2013/0056460 A1 | 3/2013 | Ben-Shmuel et al. | |
| 2013/0064942 A1 | 3/2013 | Benjamin et al. | |
| 2013/0071527 A1 | 3/2013 | Pesce et al. | |
| 2013/0105471 A1 | 5/2013 | Hach et al. | |
| 2013/0119054 A1 | 5/2013 | Ben-Shmuel et al. | |
| 2013/0240507 A1 | 9/2013 | Kimrey et al. | |
| 2013/0240508 A1 | 9/2013 | Kimrey, Jr. et al. | |
| 2013/0240510 A1 | 9/2013 | Kimrey et al. | |
| 2013/0240511 A1 | 9/2013 | Kimrey et al. | |
| 2013/0240512 A1 | 9/2013 | Kimrey et al. | |
| 2013/0240513 A1 | 9/2013 | Kimrey et al. | |
| 2013/0240514 A1 | 9/2013 | Kimrey et al. | |
| 2013/0240515 A1 | 9/2013 | Kimrey, Jr. | |
| 2013/0240516 A1 | 9/2013 | Kimrey et al. | |
| 2013/0240517 A1 | 9/2013 | Kimrey, Jr. et al. | |
| 2013/0240518 A1 | 9/2013 | Kimrey et al. | |
| 2013/0243560 A1 | 9/2013 | Kimrey, Jr. et al. | |
| 2014/0010930 A1 | 1/2014 | Barbeau et al. | |
| 2014/0053740 A1 | 2/2014 | Amedeo et al. | |
| 2014/0083820 A1 | 3/2014 | Mackay et al. | |
| 2014/0110403 A1 | 4/2014 | Nedell et al. | |
| 2014/0119989 A1 | 5/2014 | Hayashi et al. | |
| 2014/0154808 A1 | 6/2014 | Patel et al. | |
| 2014/0184063 A1 | 7/2014 | Stull, Jr. et al. | |
| 2014/0298752 A1 | 10/2014 | Keller et al. | |
| 2015/0044337 A1 | 2/2015 | Keller | |
| 2015/0136760 A1* | 5/2015 | Lima | H05B 6/705 219/709 |
| 2015/0216220 A1 | 8/2015 | Sonder | |
| 2015/0237683 A1 | 8/2015 | Polato et al. | |
| 2015/0351165 A1 | 12/2015 | Kimrey, Jr. et al. | |
| 2015/0374003 A1 | 12/2015 | Druga et al. | |
| 2016/0029685 A1 | 2/2016 | Tang et al. | |
| 2016/0045628 A1 | 2/2016 | Stull, Jr. et al. | |
| 2016/0119984 A1 | 4/2016 | Kimrey, Jr. | |
| 2016/0143342 A1* | 5/2016 | Wilson | A23L 3/01 426/231 |
| 2016/0145533 A1* | 5/2016 | Tchoukanova | A61K 35/655 514/1.1 |
| 2016/0165909 A1 | 6/2016 | Simunovic et al. | |
| 2016/0213050 A1 | 7/2016 | Van Der Voort et al. | |
| 2016/0270432 A1 | 9/2016 | Lin et al. | |
| 2016/0309549 A1 | 10/2016 | Kimrey et al. | |
| 2016/0331003 A1 | 11/2016 | Keller | |
| 2016/0345613 A1 | 12/2016 | Tang et al. | |
| 2016/0355287 A1 | 12/2016 | Keller et al. | |
| 2017/0027196 A1 | 2/2017 | Resurreccion et al. | |
| 2017/0034877 A1 | 2/2017 | Kimrey | |
| 2017/0055766 A1 | 3/2017 | Grimaldi et al. | |
| 2017/0055769 A1 | 3/2017 | Grimaldi et al. | |
| 2017/0079294 A1 | 3/2017 | Hyde et al. | |
| 2017/0188418 A1 | 6/2017 | Kimrey, Jr. | |
| 2017/0196244 A1 | 7/2017 | Simunovic | |
| 2017/0245528 A1 | 8/2017 | Hirschey et al. | |
| 2017/0311634 A1 | 11/2017 | Kimrey, Jr. et al. | |
| 2019/0075286 A1 | 3/2019 | Brick et al. | |

FOREIGN PATENT DOCUMENTS

| | | |
|---|---|---|
| CA | 2819730 | 9/2013 |
| CH | 702948 | 10/2011 |
| CN | 1141737 | 2/1997 |
| CN | 1154199 | 7/1997 |
| CN | 1191090 | 8/1998 |
| CN | 1215569 | 5/1999 |
| CN | 1259308 | 7/2000 |
| CN | 1304689 | 7/2001 |
| CN | 1069496 | 8/2001 |
| CN | 1088560 | 8/2002 |
| CN | 1432299 | 7/2003 |
| CN | 1489945 | 4/2004 |
| CN | 1179652 | 12/2004 |
| CN | 1202236 | 5/2005 |
| CN | 1611137 | 5/2005 |
| CN | 1631178 | 6/2005 |
| CN | 1631179 | 6/2005 |
| CN | 1631181 | 6/2005 |
| CN | 1676027 | 10/2005 |
| CN | 1226946 | 11/2005 |
| CN | 1227732 | 11/2005 |
| CN | 1820577 | 8/2006 |
| CN | 2896906 | 5/2007 |
| CN | 1994141 | 7/2007 |
| CN | 101015351 | 8/2007 |
| CN | 200979336 | 11/2007 |
| CN | 101107941 | 1/2008 |
| CN | 101107942 | 1/2008 |
| CN | 101112242 | 1/2008 |
| CN | 201001367 | 1/2008 |
| CN | 101124936 | 2/2008 |
| CN | 101129178 | 2/2008 |
| CN | 101167489 | 4/2008 |
| CN | 101185457 | 5/2008 |
| CN | 101224029 | 7/2008 |
| CN | 201094249 | 8/2008 |
| CN | 101259159 | 9/2008 |
| CN | 201115412 | 9/2008 |
| CN | 201157249 | 12/2008 |
| CN | 201160488 | 12/2008 |
| CN | 101341956 | 1/2009 |
| CN | 100479913 | 4/2009 |
| CN | 101396043 | 4/2009 |
| CN | 101422624 | 5/2009 |
| CN | 100500027 | 6/2009 |
| CN | 101455252 | 6/2009 |

(56) References Cited

FOREIGN PATENT DOCUMENTS

| | | |
|---|---|---|
| CN | 100512661 | 7/2009 |
| CN | 101467676 | 7/2009 |
| CN | 101467772 | 7/2009 |
| CN | 101467774 | 7/2009 |
| CN | 101480208 | 7/2009 |
| CN | 100525656 | 8/2009 |
| CN | 101507823 | 8/2009 |
| CN | 100546713 | 10/2009 |
| CN | 101558888 | 10/2009 |
| CN | 101579365 | 11/2009 |
| CN | 101589838 | 12/2009 |
| CN | 101611844 | 12/2009 |
| CN | 201370784 | 12/2009 |
| CN | 101637244 | 2/2010 |
| CN | 101642545 | 2/2010 |
| CN | 101658283 | 3/2010 |
| CN | 101664139 | 3/2010 |
| CN | 101683167 | 3/2010 |
| CN | 201481834 | 5/2010 |
| CN | 101755893 | 6/2010 |
| CN | 101766828 | 7/2010 |
| CN | 101797037 | 8/2010 |
| CN | 101810869 | 8/2010 |
| CN | 101091727 | 9/2010 |
| CN | 101120799 | 9/2010 |
| CN | 201631728 | 11/2010 |
| CN | 101897833 | 12/2010 |
| CN | 101926490 | 12/2010 |
| CN | 201657754 | 12/2010 |
| CN | 201660142 | 12/2010 |
| CN | 101961114 | 2/2011 |
| CN | 101147615 | 6/2011 |
| CN | 1995783 | 7/2011 |
| CN | 101199353 | 8/2011 |
| CN | 101433341 | 8/2011 |
| CN | 101473867 | 8/2011 |
| CN | 102150774 | 8/2011 |
| CN | 102150800 | 8/2011 |
| CN | 102188007 | 9/2011 |
| CN | 201986651 | 9/2011 |
| CN | 101627816 | 10/2011 |
| CN | 101676023 | 10/2011 |
| CN | 101700051 | 10/2011 |
| CN | 202014553 | 10/2011 |
| CN | 101305777 | 11/2011 |
| CN | 101810344 | 11/2011 |
| CN | 102228242 | 11/2011 |
| CN | 102258170 | 11/2011 |
| CN | 101703113 | 12/2011 |
| CN | 102293411 | 12/2011 |
| CN | 102349669 | 2/2012 |
| CN | 101803776 | 4/2012 |
| CN | 101327016 | 5/2012 |
| CN | 101455251 | 5/2012 |
| CN | 101637246 | 5/2012 |
| CN | 102166012 | 5/2012 |
| CN | 102475115 | 5/2012 |
| CN | 101543285 | 6/2012 |
| CN | 101695373 | 6/2012 |
| CN | 102488143 | 6/2012 |
| CN | 102511858 | 6/2012 |
| CN | 101214022 | 7/2012 |
| CN | 101455254 | 7/2012 |
| CN | 102551072 | 7/2012 |
| CN | 102599572 | 7/2012 |
| CN | 202319191 | 7/2012 |
| CN | 101455250 | 8/2012 |
| CN | 101828732 | 8/2012 |
| CN | 102630827 | 8/2012 |
| CN | 101744070 | 9/2012 |
| CN | 102669593 | 9/2012 |
| CN | 101946866 | 10/2012 |
| CN | 102028289 | 10/2012 |
| CN | 102093943 | 10/2012 |
| CN | 102406004 | 10/2012 |
| CN | 102696393 | 10/2012 |
| CN | 102696982 | 10/2012 |
| CN | 102697109 | 10/2012 |
| CN | 102697113 | 10/2012 |
| CN | 202464226 | 10/2012 |
| CN | 101766246 | 11/2012 |
| CN | 102178257 | 11/2012 |
| CN | 102763860 | 11/2012 |
| CN | 102793038 | 11/2012 |
| CN | 101243895 | 12/2012 |
| CN | 101283882 | 12/2012 |
| CN | 102018172 | 12/2012 |
| CN | 102805193 | 12/2012 |
| CN | 102805411 | 12/2012 |
| CN | 102813259 | 12/2012 |
| CN | 101816449 | 1/2013 |
| CN | 101919517 | 1/2013 |
| CN | 102349665 | 1/2013 |
| CN | 102499347 | 1/2013 |
| CN | 102871071 | 1/2013 |
| CN | 102894358 | 1/2013 |
| CN | 102894404 | 1/2013 |
| CN | 102894405 | 1/2013 |
| CN | 102894407 | 1/2013 |
| CN | 102048225 | 2/2013 |
| CN | 102907735 | 2/2013 |
| CN | 102919488 | 2/2013 |
| CN | 102940784 | 2/2013 |
| CN | 202722438 | 2/2013 |
| CN | 202750668 | 2/2013 |
| CN | 101803656 | 3/2013 |
| CN | 101953422 | 3/2013 |
| CN | 102960814 | 3/2013 |
| CN | 102972699 | 3/2013 |
| CN | 102972810 | 3/2013 |
| CN | 102986896 | 3/2013 |
| CN | 202774018 | 3/2013 |
| CN | 202774024 | 3/2013 |
| CN | 101455312 | 4/2013 |
| CN | 102028166 | 4/2013 |
| CN | 103005330 | 4/2013 |
| CN | 103039558 | 4/2013 |
| CN | 103039613 | 4/2013 |
| CN | 103039804 | 4/2013 |
| CN | 103039807 | 4/2013 |
| CN | 103039808 | 4/2013 |
| CN | 103039816 | 4/2013 |
| CN | 103039866 | 4/2013 |
| CN | 103039867 | 4/2013 |
| CN | 103039877 | 4/2013 |
| CN | 103039889 | 4/2013 |
| CN | 103039890 | 4/2013 |
| CN | 103039894 | 4/2013 |
| CN | 103039895 | 4/2013 |
| CN | 103040024 | 4/2013 |
| CN | 103053948 | 4/2013 |
| CN | 103054083 | 4/2013 |
| CN | 103054085 | 4/2013 |
| CN | 202890407 | 4/2013 |
| CN | 103070360 | 5/2013 |
| CN | 103082001 | 5/2013 |
| CN | 103098904 | 5/2013 |
| CN | 103098905 | 5/2013 |
| CN | 103109935 | 5/2013 |
| CN | 103110063 | 5/2013 |
| CN | 103110065 | 5/2013 |
| CN | 101731387 | 6/2013 |
| CN | 101766241 | 6/2013 |
| CN | 101766242 | 6/2013 |
| CN | 103126034 | 6/2013 |
| CN | 103141783 | 6/2013 |
| CN | 103156123 | 6/2013 |
| CN | 103156124 | 6/2013 |
| CN | 101228947 | 7/2013 |
| CN | 101869239 | 7/2013 |
| CN | 102379447 | 7/2013 |
| CN | 102499378 | 7/2013 |
| CN | 103181605 | 7/2013 |
| CN | 103190511 | 7/2013 |

(56) References Cited

FOREIGN PATENT DOCUMENTS

| | | |
|---|---|---|
| CN | 103211148 | 7/2013 |
| CN | 103211158 | 7/2013 |
| CN | 203058234 | 7/2013 |
| CN | 101966345 | 8/2013 |
| CN | 102220392 | 8/2013 |
| CN | 102687776 | 8/2013 |
| CN | 102793134 | 8/2013 |
| CN | 103230029 | 8/2013 |
| CN | 103250808 | 8/2013 |
| CN | 103251006 | 8/2013 |
| CN | 103251064 | 8/2013 |
| CN | 103251090 | 8/2013 |
| CN | 103262899 | 8/2013 |
| CN | 203128162 | 8/2013 |
| CN | 102687871 | 9/2013 |
| CN | 102793028 | 9/2013 |
| CN | 102813226 | 9/2013 |
| CN | 102813228 | 9/2013 |
| CN | 103039814 | 9/2013 |
| CN | 103039865 | 9/2013 |
| CN | 203194492 | 9/2013 |
| CN | 101708340 | 10/2013 |
| CN | 101766247 | 11/2013 |
| CN | 102813227 | 11/2013 |
| CN | 102948685 | 11/2013 |
| CN | 103039669 | 11/2013 |
| CN | 103039868 | 11/2013 |
| CN | 103039897 | 11/2013 |
| CN | 103039898 | 11/2013 |
| CN | 103039900 | 11/2013 |
| CN | 103039901 | 11/2013 |
| CN | 103040038 | 11/2013 |
| CN | 103040039 | 11/2013 |
| CN | 103380904 | 11/2013 |
| CN | 103380924 | 11/2013 |
| CN | 103385509 | 11/2013 |
| CN | 103385519 | 11/2013 |
| CN | 103393033 | 11/2013 |
| CN | 103393044 | 11/2013 |
| CN | 103404936 | 11/2013 |
| CN | 203262220 | 11/2013 |
| CN | 102100125 | 12/2013 |
| CN | 102697032 | 12/2013 |
| CN | 102726513 | 12/2013 |
| CN | 102754893 | 12/2013 |
| CN | 103039815 | 12/2013 |
| CN | 103039817 | 12/2013 |
| CN | 103039896 | 12/2013 |
| CN | 103039907 | 12/2013 |
| CN | 103416734 | 12/2013 |
| CN | 103431335 | 12/2013 |
| CN | 103431364 | 12/2013 |
| CN | 103431403 | 12/2013 |
| CN | 103431451 | 12/2013 |
| CN | 103445501 | 12/2013 |
| CN | 103461947 | 12/2013 |
| CN | 103461961 | 12/2013 |
| CN | 103462087 | 12/2013 |
| CN | 102835714 | 1/2014 |
| CN | 103039887 | 1/2014 |
| CN | 103039888 | 1/2014 |
| CN | 103039891 | 1/2014 |
| CN | 103478695 | 1/2014 |
| CN | 103478770 | 1/2014 |
| CN | 103478773 | 1/2014 |
| CN | 103494205 | 1/2014 |
| CN | 103494259 | 1/2014 |
| CN | 103497883 | 1/2014 |
| CN | 103497884 | 1/2014 |
| CN | 103519103 | 1/2014 |
| CN | 103535576 | 1/2014 |
| CN | 203407457 | 1/2014 |
| CN | 102524891 | 2/2014 |
| CN | 102871185 | 2/2014 |
| CN | 103005431 | 2/2014 |
| CN | 103039892 | 2/2014 |
| CN | 103039906 | 2/2014 |
| CN | 103583670 | 2/2014 |
| CN | 103584005 | 2/2014 |
| CN | 103584104 | 2/2014 |
| CN | 102835525 | 3/2014 |
| CN | 103039893 | 3/2014 |
| CN | 103039905 | 3/2014 |
| CN | 103610035 | 3/2014 |
| CN | 103653147 | 3/2014 |
| CN | 203482865 | 3/2014 |
| CN | 102885329 | 4/2014 |
| CN | 103689522 | 4/2014 |
| CN | 103719901 | 4/2014 |
| CN | 103719907 | 4/2014 |
| CN | 103719932 | 4/2014 |
| CN | 203523395 | 4/2014 |
| CZ | 9903845 | 2/2002 |
| DE | 19944631 | 3/2001 |
| DE | 19945498 | 11/2003 |
| DE | 102009039363 | 3/2011 |
| EP | 347623 | 1/1996 |
| EP | 1120121 | 8/2001 |
| EP | 1752791 | * 2/2007 |
| EP | 1884248 | 2/2008 |
| EP | 2572592 | 3/2013 |
| ES | 2304275 | 7/2009 |
| FR | 2929492 | 10/2009 |
| GB | 2428961 | 2/2007 |
| GB | 2477126 | 7/2011 |
| HK | 1151948 | 3/2013 |
| JP | 09295687 | 11/1997 |
| JP | 1017030 | 1/1998 |
| JP | 1027684 | 1/1998 |
| JP | H1017030 | 1/1998 |
| JP | 1041099 | 2/1998 |
| JP | 11104023 | 4/1999 |
| JP | 11193075 | 7/1999 |
| JP | 11236078 | 8/1999 |
| JP | 11240570 | 9/1999 |
| JP | 11318354 | 11/1999 |
| JP | 11332484 | 12/1999 |
| JP | 2000032965 | 2/2000 |
| JP | 2000060511 | 2/2000 |
| JP | 20000210032 | 8/2000 |
| JP | 2000255647 | 9/2000 |
| JP | 2001054730 | 2/2001 |
| JP | 2001061458 | 3/2001 |
| JP | 2001233317 | 8/2001 |
| JP | 2001261804 | 9/2001 |
| JP | 2002019850 | 1/2002 |
| JP | 2002034455 | 2/2002 |
| JP | 2002036456 | 2/2002 |
| JP | 2002249171 | 9/2002 |
| JP | 2003038105 | 2/2003 |
| JP | 2003125745 | 5/2003 |
| JP | 2003144084 | 5/2003 |
| JP | 3420707 | 6/2003 |
| JP | 2003159314 | 6/2003 |
| JP | 2003199542 | 7/2003 |
| JP | 2003259926 | 9/2003 |
| JP | 3477679 | 12/2003 |
| JP | 2004017449 | 1/2004 |
| JP | 2004081185 | 3/2004 |
| JP | 03557583 | 8/2004 |
| JP | 3557583 | 8/2004 |
| JP | 2004290094 | 10/2004 |
| JP | 2004323088 | 11/2004 |
| JP | 2004345648 | 12/2004 |
| JP | 3610288 | 1/2005 |
| JP | 2005144760 | 6/2005 |
| JP | 3676125 | 7/2005 |
| JP | 2005186311 | 7/2005 |
| JP | 3682263 | 8/2005 |
| JP | 2005253460 | 9/2005 |
| JP | 3701657 | 10/2005 |
| JP | 2005295848 | 10/2005 |
| JP | 2005298026 | 10/2005 |
| JP | 2006000064 | 1/2006 |

(56) References Cited

FOREIGN PATENT DOCUMENTS

| | | |
|---|---|---|
| JP | 2006102004 | 4/2006 |
| JP | 3813586 | 8/2006 |
| JP | 3872603 | 1/2007 |
| JP | 2007006861 | 1/2007 |
| JP | 3881782 | 2/2007 |
| JP | 2007084088 | 4/2007 |
| JP | 3963515 | 8/2007 |
| JP | 2007216996 | 8/2007 |
| JP | 3981212 | 9/2007 |
| JP | 2007312735 | 12/2007 |
| JP | 4043582 | 2/2008 |
| JP | 4113958 | 7/2008 |
| JP | 2008272122 | 11/2008 |
| JP | 4189969 | 12/2008 |
| JP | 4304314 | 7/2009 |
| JP | 2009201475 | 9/2009 |
| JP | 2010022364 | 2/2010 |
| JP | 2010119327 | 6/2010 |
| JP | 4499855 | 7/2010 |
| JP | 2010178814 | 8/2010 |
| JP | 2011072245 | 4/2011 |
| JP | 4732402 | 7/2011 |
| JP | 4890081 | 3/2012 |
| JP | 4918482 | 4/2012 |
| JP | 2012115204 | 6/2012 |
| JP | 2012161312 | 8/2012 |
| JP | 2012233190 | 11/2012 |
| JP | 2012236612 | 12/2012 |
| JP | 2012240695 | 12/2012 |
| JP | 5204804 | 6/2013 |
| JP | 3185647 | 8/2013 |
| JP | 2013208058 | 10/2013 |
| JP | 2014077555 | 5/2014 |
| KR | 20010010608 | 2/2001 |
| KR | 2002089912 | 11/2002 |
| KR | 20020089914 | 11/2002 |
| KR | 1020020089913 | 11/2002 |
| KR | 2002092656 | 12/2002 |
| KR | 20030012039 | 2/2003 |
| KR | 20030043229 | 6/2003 |
| KR | 100398971 | 9/2003 |
| KR | 100398972 | 9/2003 |
| KR | 100427784 | 4/2004 |
| KR | 2005109425 | 11/2005 |
| KR | 2006119445 | 11/2006 |
| KR | 2008009616 | 1/2008 |
| KR | 20090037494 | 4/2009 |
| KR | 20090109452 | 10/2009 |
| KR | 20100001375 | 1/2010 |
| KR | 101043594 | 6/2011 |
| KR | 101065945 | 9/2011 |
| KR | 101072511 | 10/2011 |
| KR | 20130038891 | 4/2013 |
| KR | 101300115 | 8/2013 |
| KR | 20130128915 | 11/2013 |
| RU | 2118886 | 9/1998 |
| RU | 2171584 | 8/2001 |
| RU | 2294124 | 2/2007 |
| RU | 2318388 | 3/2008 |
| RU | 2507516 | 2/2014 |
| SE | 600715 | 9/2007 |
| TW | M446638 | 2/2013 |
| WO | 9939751 | 8/1999 |
| WO | 0055599 | 12/2000 |
| WO | 2004088706 | 1/2005 |
| WO | 2006073909 | 7/2006 |
| WO | 2007060086 | 5/2007 |
| WO | 2007080327 | 8/2007 |
| WO | 2008063027 | 5/2008 |
| WO | 2009060414 | 5/2009 |
| WO | 2009136038 | 11/2009 |
| WO | 2010013583 | 2/2010 |
| WO | 2010091856 | 5/2011 |
| WO | 2013076458 | 7/2013 |
| WO | 2013138455 | 9/2013 |
| WO | 2013138460 | 9/2013 |
| WO | 2013074773 | 2/2014 |
| WO | 2016096951 | 6/2016 |
| WO | 2016100539 | 6/2016 |

OTHER PUBLICATIONS

Barbosa-Canovas, Gustavo V. et al., "Advanced Retorting, Microwave Assisted Thermal Sterilization (MATS), and Pressure Assisted Thermal Sterilization (PATS) to Process Meat Products," Meat Science, vol. 98, (2014), pp. 420-434.

"International Search Report and Written Opinion," for PCT Application No. PCT/US2015/066140, dated May 9, 2016 (12 pages).

2012 Edition of the Drinking Water Standards and Health Advisories, EPA 822-S-12-001, Office of Water, U.S. Environmental Protection Agency, Washington, DC, Apr. 2012, 20 pages.

"Second Examination Report," for Australian Patent Application No. 2015364693 dated May 31, 2019 (3 pages).

"Non-Final Office Action," for U.S. Appl. No. 15/725,705 dated Aug. 15, 2019 (62 pages).

"Communication Pursuant to Article 94(3) EPC," for European Patent Application No. 15825702.2 dated Apr. 1, 2020 (6 pages).

"Non-Final Office Action," for U.S. Appl. No. 16/130,730 dated Jul. 10, 2020 (4 pages).

"Request for Further Processing and Response to Communication Pursuant to Article 94(3) EPC," for European Patent Application No. 15825702.2 filed Dec. 23, 2020 (17 pages).

"Response to Non-Final Office Action," for U.S. Appl. No. 16/130,730 filed Oct. 1, 2020 (7 pages).

\* cited by examiner

ELECTROMAGNETIC WAVE FOOD PROCESSING SYSTEM AND METHODS

This application claims the benefit of U.S. Provisional Application No. 62/093,244, filed Dec. 17, 2014, the content of which is herein incorporated by reference in its entirety.

FIELD

Embodiments herein relate to electromagnetic wave food processing systems and methods.

BACKGROUND

Most food products have a tendency to spoil relatively quickly. As such, preservation techniques have been developed over many years to extend the amount of time that a given food product will remain fresh. Food preservation techniques can include dehydrating, freezing, fermenting, pickling, acidification, curing, canning, heat treating, retort sterilization, irradiating, chemical preservation and the like.

Retort sterilization typically involves the application of heat to hermetically sealed packages of food through thermal conduction. Retort sterilization allows for packaged non-frozen and non-dehydrated ready-to-eat foods that can have a shelf life of months to years.

While food preservation techniques, such as retort sterilization, have been successful at preventing food spoilage, it has been found that such techniques can have adverse effects on food products including, diminishing taste and appearance, reducing nutritional qualities, and the like.

SUMMARY

Embodiments herein include electromagnetic wave (including, but not limited to microwave) processing systems for food products and related methods. In an embodiment, a food processing system is included having a housing defining a continuous processing channel divided into a come-up chamber, a main heating chamber, and a cool-down chamber. The continuous processing channel can define at least two separate portions oriented for vertical product movement. In various embodiments, the come-up chamber, the main heating chamber, and the cool-down chamber are at least partially filled with liquid. The system can further include a product conveyor mechanism to convey food products to be processed continuously along a conveyance path passing from the come-up chamber through the main heating chamber and to the cool-down chamber. The system can further include an electromagnetic wave (such as microwave) energy emitting apparatus configured to emit energy into the main heating chamber. The average pressure in the continuous processing channel changes along the path of the conveyor mechanism.

In another embodiment, a food processing system is included wherein the come-up chamber and the cool-down chamber are at least partially filled with liquid and the main heating chamber is at least partially filled with a gas. The system can further include a product conveyor mechanism to convey food products to be processed continuously along a conveyance path passing from the come-up chamber through the main heating chamber and to the cool-down chamber. The system can further include an energy emitting apparatus configured to emit energy into the main heating chamber. The average pressure in the continuous processing channel changes along the path of the conveyor mechanism.

In another embodiment, a method for sterilizing food products is included. The method can include loading food products to be processed onto a conveyor mechanism, passing the food products vertically through a first liquid column by movement of the conveyor mechanism, passing the food products into a liquid filled main heating chamber by movement of the conveyor mechanism, heating the food products with electromagnetic wave energy and passing the food products vertically through a second liquid column by movement of the conveyor mechanism.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

Figure 1:
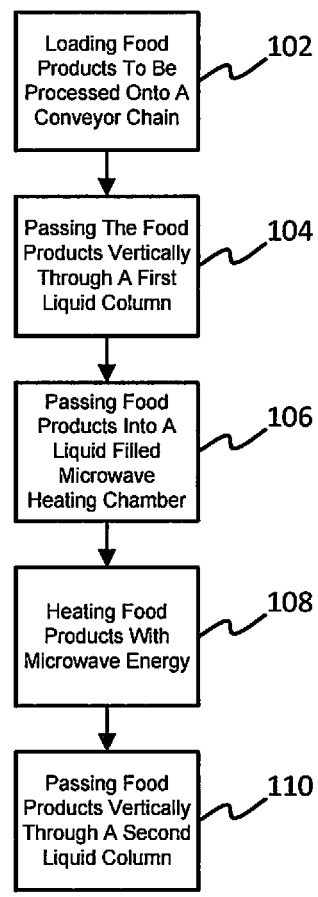
FIG. 1 is a flow chart showing operations that can be performed in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Microwave heating technology was discovered in the 1940s. Microwaves have long been used to heat food as a form of cooking and to attain a desirable serving temperature. Microwaves heat food by penetrating through the food and causing dipolar water molecules present within the food to rotate to align their dipoles with respect to the changing electric field associated with microwave energy. The movement of the water molecules generates heat energy.

However, the application of microwave technology to commercial scale food processing (sterilization or pasteurization) systems has proven to be challenging for many reasons. First, commercial scale food processing systems must have sufficiently high throughput to be economically viable. The use of physical gates, doors, or other types of physical chamber locks to isolate segments of a food processing system has functioned to prevent system throughput from reaching desirably high levels. Second, commercial scale food processing systems must operate with high consistency with respect to their microorganism inactivating effects. The wave-based physics of microwave energy means that systems relying upon microwave energy are more susceptible to issues such as hot and cold spots in contrast to traditional retort systems which simply rely upon thermal conduction.

Various embodiments of microwave processing systems and methods herein address one or more of the issues noted above including one or more of high throughput and high process consistency. In various embodiments, food products processed with systems and/or according to methods herein can be more nutritionally dense than otherwise identical product that are thermally processed according to other techniques such as traditional retort processes.

Some embodiments of systems herein can process food products at a higher rate than previous systems. In some embodiments, systems herein can be configured to process from 1 to 3000 or more food containers per minute. In some embodiments, the system can be configured to process food containers at a speed greater than 500 containers per minute. In some embodiments, the system can be configured to process food containers at a speed greater than 750 containers per minute. In some embodiments, the system can be configured to process food containers at a speed greater than 1000 containers per minute. In some embodiments, the system can be configured to process food containers at a speed greater than 1250 containers per minute. In some embodiments, the system can be configured to process food containers at a speed greater than 1500 containers per minute. In some embodiments, the system can be configured to process food containers at a speed greater than 1750 containers per minute. In some embodiments, the system can be configured to process food containers at a speed greater than 2000 containers per minute. In some embodiments, the system can be configured to process food containers at a speed greater than 2250 containers per minute. In some embodiments, the system can be configured to process food containers at a speed greater than 2500 containers per minute. In some embodiments, the system can be configured to process food containers at a speed greater than 2750 containers per minute. In some embodiments, the system can be configured to process food containers at a speed greater than 3000 containers per minute. As used herein, the term "food product" shall include both foods of all types as well as drinks of all types, unless used explicitly to the contrary. Food products herein can include shelf-stable food products, extended shelf-life products, ready-to-eat food products, chilled food products, refrigerated food products, and the like. Food products herein can include acidified and non-acidified food products. By way of example, food products can include food products having a pH of below 4.6 as well as food products having a pH of 4.6 or higher. Food products herein can include high nutritional density food products. Food products herein can include human food products, pet food products, geriatric food products, food products for at-risk populations, baby food products, nutriceuticals, and the like. Food products herein can include, but are not limited to, soups, soups with particulates, sauces, concentrates, condiments, salsas, dips, fruits, vegetables, nut products, grain products, pasta products, food components or ingredients, beverages of all types, dairy products, meat products, fish products, entrees, combinations of any of these, and the like. Food products herein can also specifically include those that include a first type of food in a first portion of a package and a second type of food in a second portion of a package separated from the first portion.

As used herein, the term "food package" shall be synonymous with the term "food container". Food packages/containers can include many different types including, but not limited to, jars, cans, bottles, bowls, trays, multi-pack packages, bags, sleeves, pouches, and the like. Food packages/containers can be rigid, semi-rigid, semi-flexible, or flexible. In various embodiments the food packages herein can be substantially transparent to microwave energy. In various embodiments portions of food packages herein can be substantially transparent to microwave energy while other portions can absorb or reflect microwave energy.

It will be appreciated that systems and methods herein can be used for both sterilization and pasteurization processes. References to "processing" of food items herein shall include both sterilization and pasteurization unless the context dictates otherwise.

Referring now to FIG. 1, aspects of an embodiment are shown. In a one operation the system or method can include loading food products (within food packages) to be processed onto a conveyor mechanism 102. The conveyor mechanism 102 can include, but is not limited to, a conveyor chain, conveyor belt, conveyor track, or the like. In some embodiments, the temperature of the food products as they are being fed into the system can be from about −20 degrees Fahrenheit to about 300 degrees Fahrenheit, though the temperature of such products is not limiting. In some embodiments, the food products can be loaded onto the conveyor mechanism automatically, as fed from a conveyor belt, guide rail, or the like. In other embodiments the food products can be loaded manually.

In some embodiments, the conveyor mechanism or portions thereof can extend continuously (e.g. uninterrupted physically) throughout the various chambers of the system. In some embodiments, the conveyor mechanism can form a continuous loop. The conveyor mechanism can be of sufficient size and move with sufficient speed as to provide sufficient time for the system to rapidly heat the food product inside the food package, while preventing or reducing the potential for hot spots on the packaging itself as well as hotspots within interior areas of the food product. In some embodiments, the conveyor mechanism moves continuously. In some embodiments, the conveyor mechanism moves discontinuously. By way of example, the movement of food products through the system could include intermittent stops. In some embodiments, such intermittent stops can be in synchrony with microwave emitters of the system switching between on and off modes, such that microwave energy is provided in a pulsed manner.

In some embodiments, the conveyor mechanism moves with a constant speed. In other embodiments, the conveyor mechanism moves with a varying speed depending on factors such as the alignment or non-alignment of food products with microwave units and/or components thereof.

In some embodiments, the conveyor mechanism can include mechanical holding elements to connect the food products to the conveyor mechanism. By way of example, mechanical holding elements can include, but are not limited to, trays, baskets, cages, clips, hooks, brackets and the like. For example, in some embodiments a plurality of retaining trays can be attached to the product conveyor mechanism. In some embodiments, the conveyor mechanism can accommodate multiple food products arranged laterally across the conveyor mechanism transverse to the axis of motion. For example, retaining trays attached to the product conveyor belt can be configured to hold a plurality of individual food containers laterally across the tray. In some embodiments, the arrangement of multiple food products laterally across the conveyor mechanism with one or more mechanical holding elements can be referred to as a "flight".

In another operation the system or method can include passing the food products vertically through a first liquid column by movement of the conveyor mechanism 104. It will be appreciated that, due to the force of gravity, the deeper one goes in a column of a liquid the higher the pressure is, all other things being equal. Rather than separating an area of higher pressure from an area of lower pressure with a sealing mechanical element such as a gate or a door, such areas of differing pressure can be separated with a column of a liquid such as water. As such, by passing the food products vertically, and specifically downward, through a first liquid column the food products can be exposed to an environment of higher pressure. In some embodiments, passing the food products downward through a first liquid column can also include preheating the food products through direct contact of the packages of food products with a medium that is at a higher temperature than the food products. However, other means of preheating the food products are also contemplated herein. In some embodiments, the food products can be passed through additional columns of water upstream of the main microwave heating chamber in order to increase pressure further while limiting the total height of any one liquid column.

In another operation the system or method can include passing the food products into a main microwave heating chamber by movement of the conveyor mechanism 106. In many embodiments, the main microwave heating chamber can be liquid filled. However, in some embodiments, at least a portion of the main microwave heating chamber can be filled with a gas, such as steam.

In some embodiments, the main microwave heating chamber is completely filled with liquid at a pressure above 0 psig. In some embodiments, the average pressure in the main microwave heating chamber is from about 0 psig to about 60 psig. In some embodiments, the average pressure in the main microwave heating chamber is from about 0 psig to about 60 psig. In some embodiments, the pressure can be applied to accommodate off-setting of the internal pressure of the package to the internal pressure of the system so as to balance between the two for an acceptable variation range that prevents permanent deformation of the food package or destruction of the food package in the system.

Various components can be disposed within or adjacent to the main microwave heating chamber. By way of example, sensors (including, but not limited to, temperature sensors, microwave energy sensors, pressure sensors, proximity or distance sensors, optical sensors, ultrasonic sensors, infrared sensors, and the like) can be disposed within or adjacent to the main microwave heating chamber.

In some embodiments, the maximum height of liquid in the main microwave heating chamber is lower than the maximum height of liquid in the come-up chamber and the cool-down chamber.

In another operation the system or method can include heating the food products with microwave energy 108. The heat generated by the microwave energy, in addition to heat that may be picked up by the food packages in the system (such as through conduction of heat from fluids such as liquids or gases surrounding food packages), can be sufficient to inactivate microorganisms.

In some embodiments, the amount of heat transferred to the food packages can include contributions through processes of conduction, convection, and/or radiation. Beyond the application of microwave radiation and the contributions of fluids or gases surrounding the food packages, other methods of applying heat that can be used in various embodiments herein include the application of radiofrequency based heating, infrared based heating mechanisms, and other electromagnetic wave based mechanisms.

In some embodiments, the heat generated by the microwave energy, in addition to heat that may be picked up by the food packages in the system, can be sufficient to pasteurize the food products. In some embodiments, the heat generated by the microwave energy, in addition to heat that may be picked up by the food packages in the system, can be sufficient to sterilize the food products.

By way of example, in some embodiments, the food products can be sufficiently processed so as to achieve a 1 log, 2 log, 3 log, 4 log, 5 log, or 6 log reduction or greater in viable, vegetative microorganisms. In some embodiments the food products can be sufficiently processed so as to achieve a 1 log, 2 log, 3 log, 4 log, 5 log, or 6 log or greater reduction in microorganism spores. In some embodiments the food products can be sufficiently processed so as to achieve a 12 log reduction in spores, such as *Clostridium botulinum*. In some embodiments the food products can be sufficiently processed so as to achieve commercial pasteurization or commercial sterilization. The system can include a controller module and a controller program to calculate the total dosage of microwave energy and determine if the prescribed lethality was achieved per station as well as total lethality.

In various embodiments, the residence time of food product containers in the system can be from greater than 0 seconds to 150 minutes. In various embodiments, the residence time of food product containers in the system can be less than 150 minutes, 120 minutes, 90 minutes, 60 minutes, 45 minutes, 40 minutes, 35 minutes, 30 minutes, 25 minutes, 20 minutes, 15 minutes, 10 minutes, or 5 minutes. In some embodiments, the residence time of food product containers in the system can be in a range wherein any of the preceding numbers can form the upper or lower bound of the range provided that the upper bound is larger than the lower bound. In various embodiments, the residence time of food product containers in the main microwave heating chamber can be from greater than 0 seconds to 120 minutes.

In various embodiments, the total time that food product containers are exposed to microwave energy from 1 minute to 60 minutes. In various embodiments, the total time that food product containers are exposed to microwave energy from 1 minute to 30 minutes. In various embodiments, the total time that food product containers are exposed to microwave energy can be from 5 minutes to 20 minutes. In various embodiments, the total time that food product containers are exposed to microwave energy is less than 15 minutes.

In another operation, the system or method can include passing the food products vertically through a second liquid column by movement of the conveyor mechanism 110. By passing the food products vertically, and in this case specifically upward, through a second liquid column the food products can be brought back into an environment of lower pressure (relative to the pressure in the main microwave heating chamber). In some embodiments, passing the food products upward through a second liquid column can also include cooling the food products through direct contact of the packages of food products with a medium that is at a lower temperature than the food products. However, other means of cooling the food products are also contemplated herein. In some embodiments, the food products can be passed through additional columns of water downstream of the main microwave heating chamber in order to decrease pressure further while limiting the total height of any one liquid column.

Other operations can also be conducted beyond those mentioned above. By way of example, in some embodiments, after passing through the main microwave heating chamber and though one or more columns of a liquid, the food products can pass through an air cooling apparatus, such as an atmospheric pressure cooling tower, to further cool the food products. Many other operations are also contemplated herein.

In embodiments where there is liquid in the come-up chamber, main microwave heating chamber, and/or the cool-down chamber, the liquids in those respective chambers can be the same or different from one another. In some embodiments, the liquid is a polar liquid. In some embodiments, the liquid is a non-polar liquid. In some embodiments, the liquid is water. In some embodiments, the liquid is a non-aqueous liquid. In some embodiments, the liquid is polyethylene glycol. In some embodiments, the liquid is a mixture of components. In some embodiments the total dissolved solids and total suspended solids of the liquid is maintained within a predetermined range. In some embodiments, the liquid can have a total dissolved solids (TDS) concentration of between 100 mg/L and 1,500 mg/L. In some embodiments, the liquid can have a total suspended solids (TSS) concentration of between 1 mg/L and 1,500 mg/L or between 100 mg/L and 1,500 mg/L. In some embodiments, the liquid can have a pH of between 6.5 and 8.5 or between 6.5 and 7. In some embodiments, the liquid can have a residual free chlorine, free bromine, and/or free iodine content of between 0.01 and 8 ppm (as measured by each component or in the aggregate).

Figure 2:
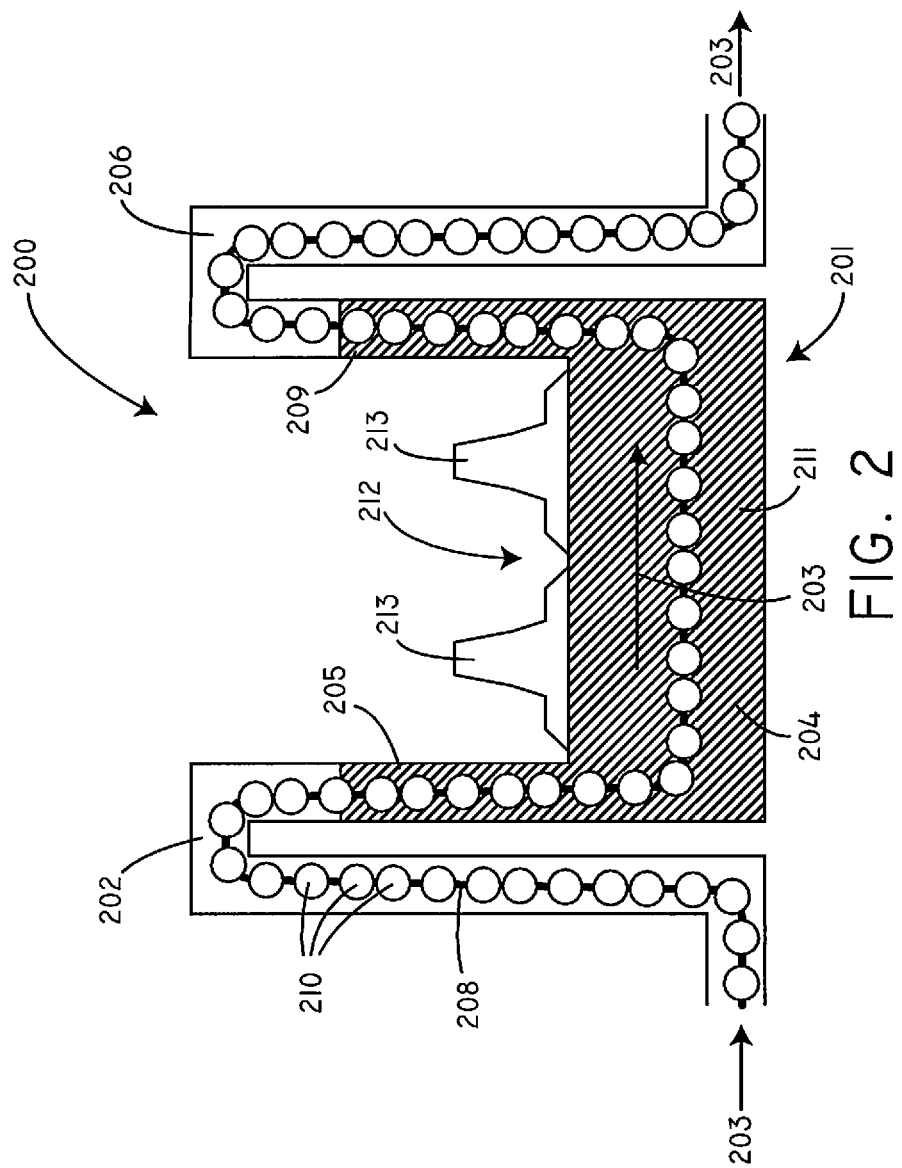
FIG. 2 is a schematic side view of a processing system in accordance with various embodiments herein.

Referring now to FIG. 2, a schematic side view of a processing system 200 in accordance with various embodiments herein is shown. The processing system 200 includes a continuous processing channel 201. The continuous processing channel 201 can include a come-up chamber or zone 202. In some embodiments, the come-up chamber can include the initial application of heat to food products and thereby raising the temperature of the food products. In some embodiments, the come-up chamber can include increasing the pressure to which the food products are exposed. The continuous processing channel can also include a main microwave heating chamber or zone 204 and a cool-down chamber or zone 206 (or in cases where cooling is not done at this stage an output chamber).

The come-up chamber 202 can be oriented for vertical product movement. In specific, the come-up chamber 202 can be oriented for vertical movement of food products (or trays or flights of food products) 210 along a product conveyor mechanism 208 through the continuous processing channel 201 of the processing system 200 in the direction of arrows 203. In some embodiments, an actuator or similar mechanism can be disposed within the come-up chamber 202 in order to cause rotation (such as axial rotation) of the food products.

Various mechanisms can be used to begin warming the food products within the come-up chamber 202. By way of example, a microwave emitter array can be positioned to begin heating products within the come-up chamber 202. In some embodiments, the liquid within the come-up chamber 202 can itself be heated in order to transfer heat to the food products through conduction.

The come-up chamber 202 can include a liquid column 205. In this case, the liquid column 205 is in fluid communication with the main microwave heating chamber 204. The liquid column 205 exerts a force downward onto the liquid in the main microwave heating chamber 204 such that the pressure in the main microwave heating chamber 204 is higher than in the area above the liquid column 205 (for example, in many cases above atmospheric pressure). In some embodiments, the maximum pressure within the come-up chamber 202 is from about 0 psig to about 60 psig. In some embodiments, the temperature of the liquid in the come-up chamber 202 can be from about 32 degrees Fahrenheit to about 300 degrees Fahrenheit.

The height of the come-up chamber 202 can vary. In general, the taller the come-up chamber is, the taller the water column(s) therein can be. As such, the height can vary depending on the desired water column height which in turn can vary based on desired pressures. However, in some embodiments the height of the come-up chamber can be greater than about 2, 4, 6, 8, 10, 15, 20, 25, 30, 40, 50, 60, 70, or 100 feet. In some embodiments, the height of the come-up chamber can be in a range wherein each of the foregoing numbers can serve as the lower or upper bound of the range provided that the upper bound is higher than the lower bound.

In some embodiments the height of one or more water columns in the come-up chamber can be greater than about 1, 3, 5, 7, 9, 14, 19, 24, 29, 39, 49, 59, 69, or 99 feet. In some embodiments, the height of one or more water columns in the come-up chamber can be in a range wherein each of the foregoing numbers can serve as the lower or upper bound of the range provided that the upper bound is higher than the lower bound.

In some embodiments, the come-up chamber 202 can be substantially air-tight except for the area where food products enter the come-up chamber 202 and the area where food products exit the come-up chamber 202. In some embodiments, access hatches or ports (including but not limited to fluid exchange ports) and/or observation windows can be included at various points along the path of the come-up chamber 202.

Food products 210 can be moved by the product conveyor mechanism 208 from the come-up chamber 202 and into a following chamber such as the main microwave heating chamber 204. It will be appreciated, however, that in some embodiments food products may enter a holding chamber before entering the main microwave heating chamber 204. The main microwave heating chamber 204 can be filled with a liquid 211. The processing system 200 can include a microwave energy emitting apparatus 212 in order to deliver microwave energy to the main microwave heating chamber 204. In some embodiments, an actuator or similar mechanism can be disposed within the microwave heating chamber 204 in order to cause rotation (such as axial rotation) of the food products. However, in other embodiments, the conveyor mechanism 208 in the main microwave heating chamber 204 is designed to hold the food products in a substantially static plane.

In some embodiments, the head space above the food products in the main microwave heating chamber 202 (e.g., distance between the top of the food product and the inner wall of the microwave heating chamber above the food product) is relatively small. By way of example, the head space can be less than about 50 cm, 40 cm, 30 cm, 20 cm, 10 cm, 5 cm, or 1 cm. In some embodiments, the head space can be greater than about 0.2 cm, 0.5 cm, 0.8 cm, 1 cm, 1.5 cm, 2 cm, 3 cm, or 5 cm. In some embodiments, the head space can be in a range with any of the preceding numbers representing the lower and upper bounds of the range provided that the upper bound is larger than the lower bound.

In some embodiments, the main microwave heating chamber 204 can be substantially air-tight except for the area where food products enter the main microwave heating chamber 204 and the area where food products exit the main microwave heating chamber 204. In some embodiments, access hatches or ports (including but not limited to fluid exchange ports) and/or observation windows can be included at various points along the path of the main microwave heating chamber 204.

In some embodiments, the temperature of the liquid in the microwave heating chamber 204 can be from about 32 degrees Fahrenheit to about 300 degrees Fahrenheit. In some embodiments, the liquid temperature can be stabilized to a target temperature using a heat exchanger, heat regulator, heating device, cooling device, etc.

The microwave energy emitting apparatus 212 can include one or more microwave units 213. In some embodiments, each microwave unit 213 can be separate from one another and can each have their own emitter (such as a magnetron or other emitter), waveguide, horn, waveguide cover, etc. In other embodiments, microwave units 213 can share components such as a shared magnetron. In some embodiments, the microwave units 213 can be arranged into an array. By way of example, in some embodiments, the microwave energy emitting apparatus 212 can include from 1 to 40 microwave units 213. In some embodiments, the microwave units 213 can be arranged into a grid.

In some embodiments, the microwave units can be placed at varied distances from each other to allow food product within each food package to equilibrate in temperature before traveling under the next microwave unit. In contexts where it is relevant, the equilibrium period could range from 1 second to 20 minutes. In some embodiments, the speed of the conveyor mechanism can be changed to accommodate a desired thermal equilibration time. By way of example, in some embodiments, the conveyor mechanism can be stopped or slowed down to accommodate a desired thermal equilibration time.

In some embodiments, the microwave energy emitting apparatus 212 can be configured to emit energy continuously. In some embodiments, the microwave energy emitting apparatus 212 can be configured to emit energy intermittently. In some embodiments, the intensity of the emitted energy can be constant. In some embodiments, the intensity of the emitted energy can be varied. In some embodiments, the microwave energy emitting apparatus 212 can be configured to emit energy in response to one or more triggering events, such as when food products pass a triggering sensor.

In some embodiments, the microwave units 213 can emit microwave energy at a frequency from approximately 300 MHz to approximately 2550 MHz or between 800 MHz to approximately 2550 MHz. In some embodiments, the microwave units 213 can emit microwave energy at a frequency from approximately 915 MHz or approximately 2450 Mhz. In some embodiments, all microwave units 213 can emit microwave energy at a common frequency. In other embodiments, microwave units 213 can emit energy at different frequencies. For example, the microwave units 213 can emit microwave energy at a first frequency of approximately 915 MHz and a second frequency of approximately 2450 Mhz. It is believed that higher frequencies, such as around 2450 MHz, can be useful for surface related effects such as browning, searing, carmelization, etc. In some embodiments, units emitting at higher frequencies around 2450 MHz can be disposed toward the end of the main microwave heating chamber. In some embodiments, other types of heating units that may be useful in browning or similar processes, such as infrared heating units, can be preferentially disposed toward the end of the main microwave heating chamber.

While in many embodiments the system can include the application of microwave energy, in other embodiments, energy can be applied from another portion of the electromagnetic spectrum, either by itself or in combination with other wavelengths of electromagnetic radiation. For example, in various embodiments herein, the application of electromagnetic energy with a frequency of between 13.56 MHz to 300 MHz can be included. It will be appreciated that references herein to chambers of the apparatus, emitters, and other components that specifically reference microwaves are also applicable in the context of the application of electromagnetic radiation with a frequency of between about 13.56 MHz to about 300 MHz.

In general, microwave energy at lower frequencies (e.g., around 915 MHz) penetrate into food products more deeply than microwave energy at a higher frequency (e.g., around 2450 MHz). In some embodiments, emitters that provide microwave energy at frequencies that penetrate less (e.g., higher frequencies) can be arranged toward the downstream side of the main microwave heating chamber 204 and thus closer in both proximity and time to the cool-down chamber 206. Similarly, emitters that provide microwave energy at frequencies that penetrate more (e.g., lower frequencies) can be arranged toward the upstream side of the main microwave heating chamber 204 to accommodate the placement of the other emitters.

While the microwave units 213 in FIG. 2 are shown arranged on the top of the main microwave heating chamber 204, it will be appreciated that the microwave units 213, or at least a portion of them such as a waveguide, horn, waveguide cover, or the like can be arranged on any of the top, bottom, or sides of the main microwave heating chamber 204. In some embodiments the microwave units 213 are arranged opposed from one another on opposite sides of the main microwave heating chamber 204. In some embodiments, microwave units 213 can be arranged in an offset or staggered pattern.

The microwave units 213 and/or the system can be configured to deliver microwave radiation to the food packages multidirectionally or unidirectionally. In many embodiments, the microwave units 213 and/or the system can be configured to deliver microwave radiation to the food packages unidirectionally. As such, in embodiments providing microwave radiation unidirectionally, the system herein stands in contrast to many consumer microwave ovens wherein microwave radiation bounces off walls and may therefore hit an item to be heated from many different angles simultaneously. In various embodiments, stray microwave radiation can be absorbed by the fluid in the system surrounding the food products. In some embodiments, the interior of one or more chambers of the system can be lined with a material that absorbs microwave radiation instead of reflecting it.

Food products 210 can be moved by the product conveyor mechanism 208 from the main microwave heating chamber 204 and into a following chamber such as the cool-down chamber 206. It will be appreciated, however, that in some embodiments food products may enter a holding chamber before entering the cool down chamber 206. The cool-down chamber 206 can also be oriented for vertical product movement.

In specific, the cool-down chamber 206 can be oriented for vertical movement of food products 210 (or a flight of food products) along a product conveyor mechanism 208 through the continuous processing channel 201 of the processing system 200 in the direction of arrows 203. In some embodiments, an actuator or similar mechanism can be disposed within the cool-down chamber 206 in order to cause rotation (such as axial rotation) of the food products.

The cool-down chamber 206 can also include a liquid column 209. In this case, the liquid column 209 is in fluid communication with the main microwave heating chamber 204. The liquid column 209 exerts a force downward onto the liquid in the main microwave heating chamber 204 such that the pressure in the main microwave heating chamber 204 is higher than in the area above the liquid column 209 (for example, in many cases above atmospheric pressure). In some embodiments, the maximum pressure within the cool-down chamber 206 is from about 0 psig to about 60 psig. In various embodiments, the temperature of the liquid in the cool-down chamber 206 can be from about 32 degrees Fahrenheit to about 300 degrees Fahrenheit. The final temperature of food products exiting the system can vary, but in some embodiments the final temperature (exit temperature) can be from about 32 degrees to about 212 degrees. In some embodiments the final temperature (exit temperature) can be from about 80 degrees to about 150 degrees.

In some embodiments, the cool-down chamber 206 can be substantially air-tight except for the area where food products enter the cool-down chamber 206 and the area where food products exit the cool-down chamber 206. In some embodiments, access hatches or ports (including but not limited to fluid exchange ports) and/or observation windows can be included at various points along the path of the cool-down chamber 206.

The height of the cool-down chamber 206 can vary. In general, the taller the cool-down chamber is, the taller the water column(s) therein can be. As such, the height can vary depending on the desired water column height which in turn can vary based on desired pressures. However, in some embodiments the height of the cool-down chamber can be greater than about 2, 4, 6, 8, 10, 15, 20, 25, 30, 40, 50, 60, 70, or 100 feet. In some embodiments, the height of the cool-down chamber can be in a range wherein each of the foregoing numbers can serve as the lower or upper bound of the range provided that the upper bound is higher than the lower bound.

In some embodiments the height of one or more water columns in the cool-down chamber can be greater than about 1, 3, 5, 7, 9, 14, 19, 24, 29, 39, 49, 59, 69, or 99 feet. In some embodiments, the height of one or more water columns in the cool-down chamber can be in a range wherein each of the foregoing numbers can serve as the lower or upper bound of the range provided that the upper bound is higher than the lower bound.

Figure 3:
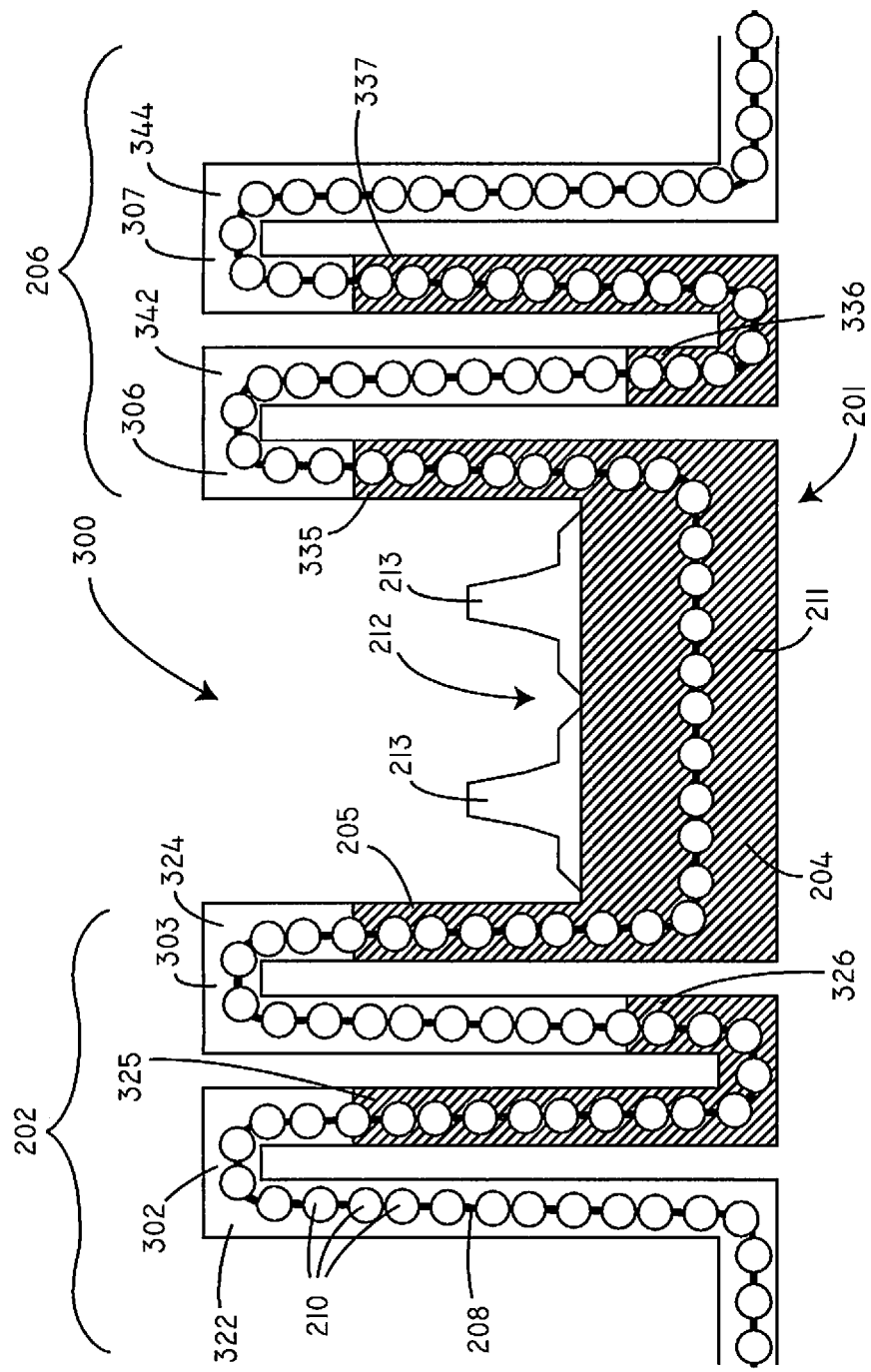
FIG. 3 is a schematic side view of a processing system in accordance with various embodiments herein.

The pressure that can be provided by a single column of a liquid is typically limited by the height of the column of liquid. However, columns can be arranged in series with one another in order to reach higher pressures for a given limitation on total height. In some cases, additional legs of a portion of the system (come-up, cool-down, etc.) providing additional liquid columns to achieve higher (or lower) pressures can be referred to as over-pressure chambers. Referring now to FIG. 3, a schematic side view of a processing system 300 in accordance with various embodiments herein is shown illustrating the use of multiple columns of liquid. The processing system 300 includes a continuous processing channel 201. The continuous processing channel 201 can include a come-up chamber or zone 202, a main microwave heating chamber or zone 204, and a cool-down chamber or zone 206. The main microwave heating chamber or zone 204 can be filled with a liquid 211. The processing system 200 can also include a microwave energy emitting apparatus 212.

The come-up chamber 202 can include a first leg 302 and a second leg 303. The first leg 302 includes a first upstream (e.g., upstream from the main microwave heating chamber 204) column of liquid 325 in fluid communication with a second upstream column of liquid 326. In this case, the height of the first upstream column of liquid 325 is higher than the height of the second upstream column of liquid 326 and thus at steady-state the pressure inside the head space 324 of the second leg 303 is higher than inside the head space 322 of the first leg 302. The pressure inside the head space 324 of the second leg 303 effectively adds to the amount of force that is exerted downward by the third upstream column of liquid 327. As such, the pressure in the main microwave heating chamber 204 is higher than would otherwise be attained by the third upstream column of liquid 327 alone.

The cool-down chamber 206 can include a first leg 306 and a second leg 307. The first leg 306 includes a first downstream (e.g., downstream from the main microwave heating chamber 204) column of liquid 335 in fluid communication with a second downstream column of liquid 336. The second leg 307 includes a third downstream column of liquid 337. In this case, because of the forces exerted by the columns of liquid, the pressure inside the head space 342 of the first leg 306 is higher than inside the head space 344 of the second leg 307.

Figure 4:
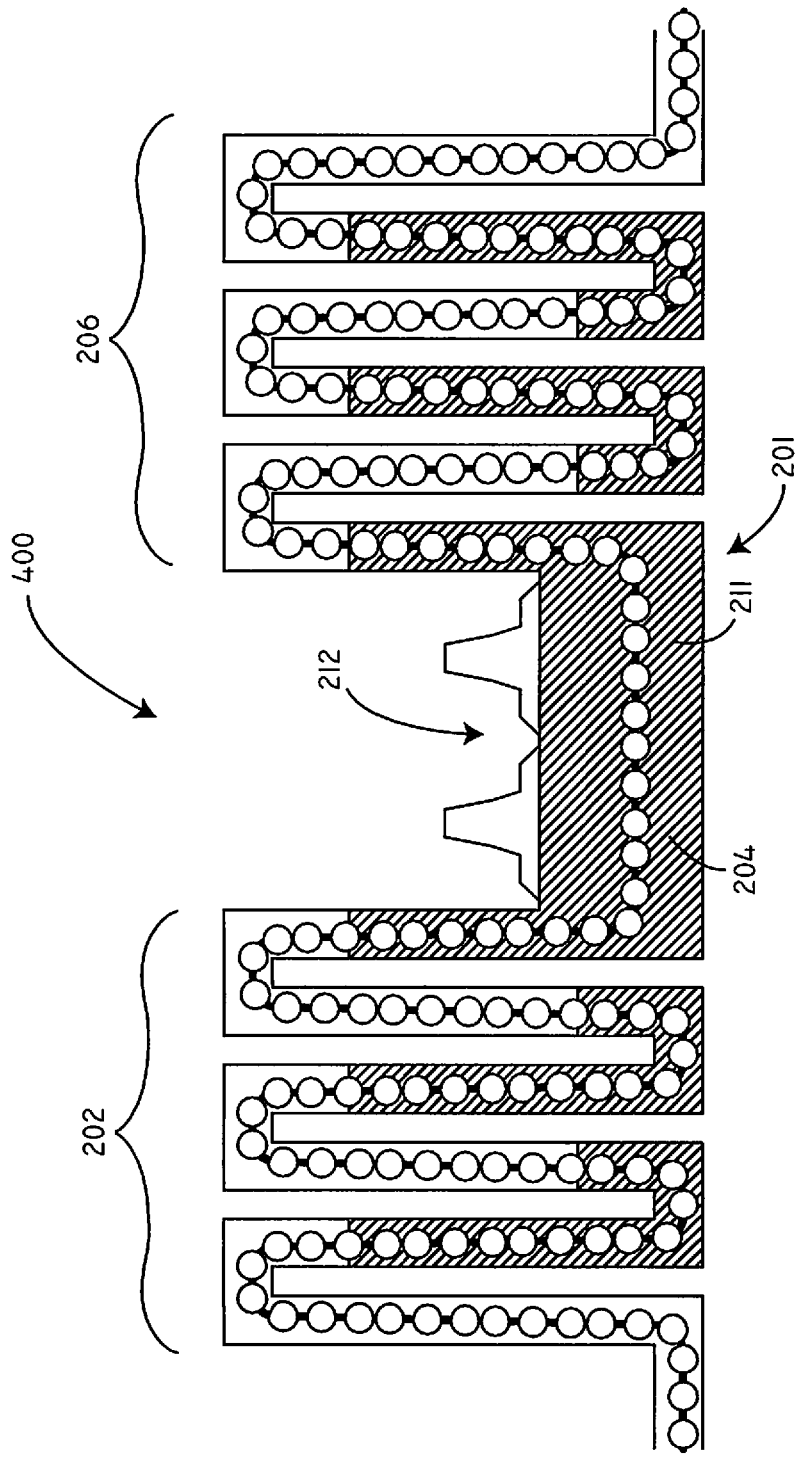
FIG. 4 is a schematic side view of a processing system in accordance with various embodiments herein.

It will be appreciated that additional legs can be added to one or both of the upstream and downstream sides of the microwave heat chamber in order to achieve greater or lesser pressures. Referring now to FIG. 4, a schematic side view of a processing system 400 in accordance with various embodiments herein is shown. The processing system 400 includes a continuous processing channel 201. The continuous processing channel 201 can include a come-up chamber or zone 202, a main microwave heating chamber or zone 204, and a cool-down chamber or zone 206. The system 400 can also include a microwave energy emitting apparatus 212. The main microwave heating chamber or zone 204 can be filled with a liquid 211.

In this example, the come-up chamber 202 can include three legs. Similarly, the cool-down chamber can also include three legs. While these examples show equal numbers of upstream and downstream legs, it will be appreciated that the system can also be designed with unequal number of legs between the upstream and downstream sides.

Figure 5:
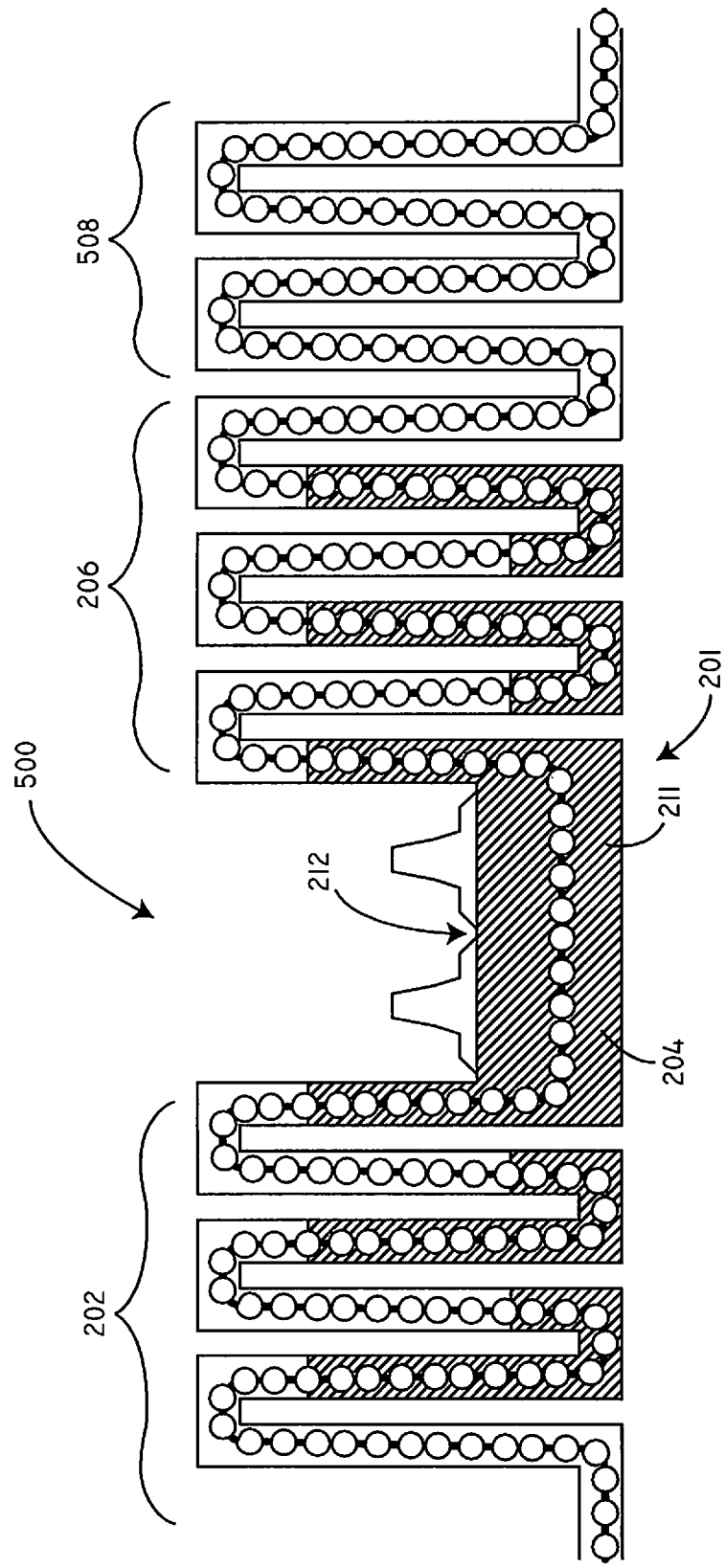
FIG. 5 is a schematic side view of a processing system in accordance with various embodiments herein.

In some embodiments, the processing system can also include other components along the continuous processing channel. By way of example, the processing system can also include an air-filled cooling chamber (at atmospheric pressure or a different pressure). Referring now to FIG. 5, a schematic side view of a processing system 500 in accordance with various embodiments herein is shown. The processing system 400 includes a continuous processing channel 201. The continuous processing channel 201 can include a come-up chamber or zone 202, a main microwave heating chamber or zone 204, and a cool-down chamber or zone 206. The system 400 can also include a microwave energy emitting apparatus 212. The main microwave heating chamber or zone 204 can be filled with a liquid 211. In this case, the system 400 can also include an air-filled cooling chamber 508 (or cooling tower) to receive food products from the cool-down chamber 206. While in this embodiment the air-filled cooling chamber 508 is shown directly connected to the cool-down chamber 206, in some embodiments there can be other components disposed in between.

Figure 6:
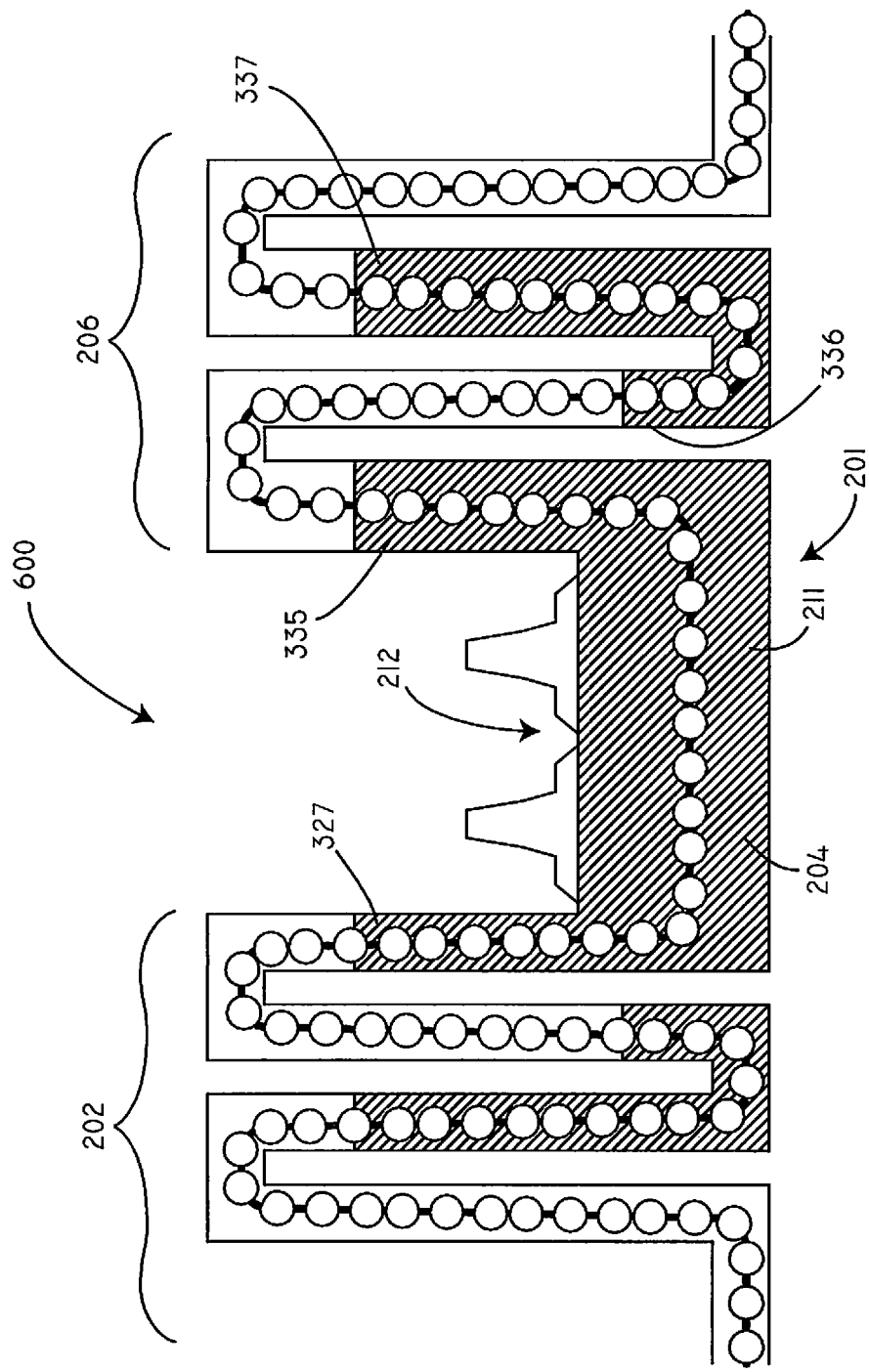
FIG. 6 is a schematic side view of a processing system in accordance with various embodiments herein.

In some embodiments, the horizontal dimensions of liquid columns in the system can all be the same. In other embodiments, different liquid columns can have different horizontal dimensions. As such, the liquid columns (even those in direct contact with one another) can be asymmetric. Referring now to FIG. 6, a schematic side view of a processing system 600 in accordance with various embodiments herein is shown. The processing system 600 includes a continuous processing channel 201. The continuous processing channel 201 can include a come-up chamber or zone 202, a main microwave heating chamber or zone 204, and a cool-down chamber or zone 206. The main microwave heating chamber or zone 204 can be filled with a liquid 211. The system 600 can also include a microwave energy emitting apparatus 212. The third upstream liquid column 327 can have a first width and the first downstream liquid column 335 can have a second width that is different than the first width. As such, based on the principle of fluid displacement, a given amount of vertical movement of the top of the third upstream liquid column 327 will result in a smaller amount of vertical movement of the top of the first downstream liquid column 335. Similarly, the second downstream liquid column 336 can have a third width and the third downstream liquid column 337 can have a fourth width that is different than the third width.

Figure 7:
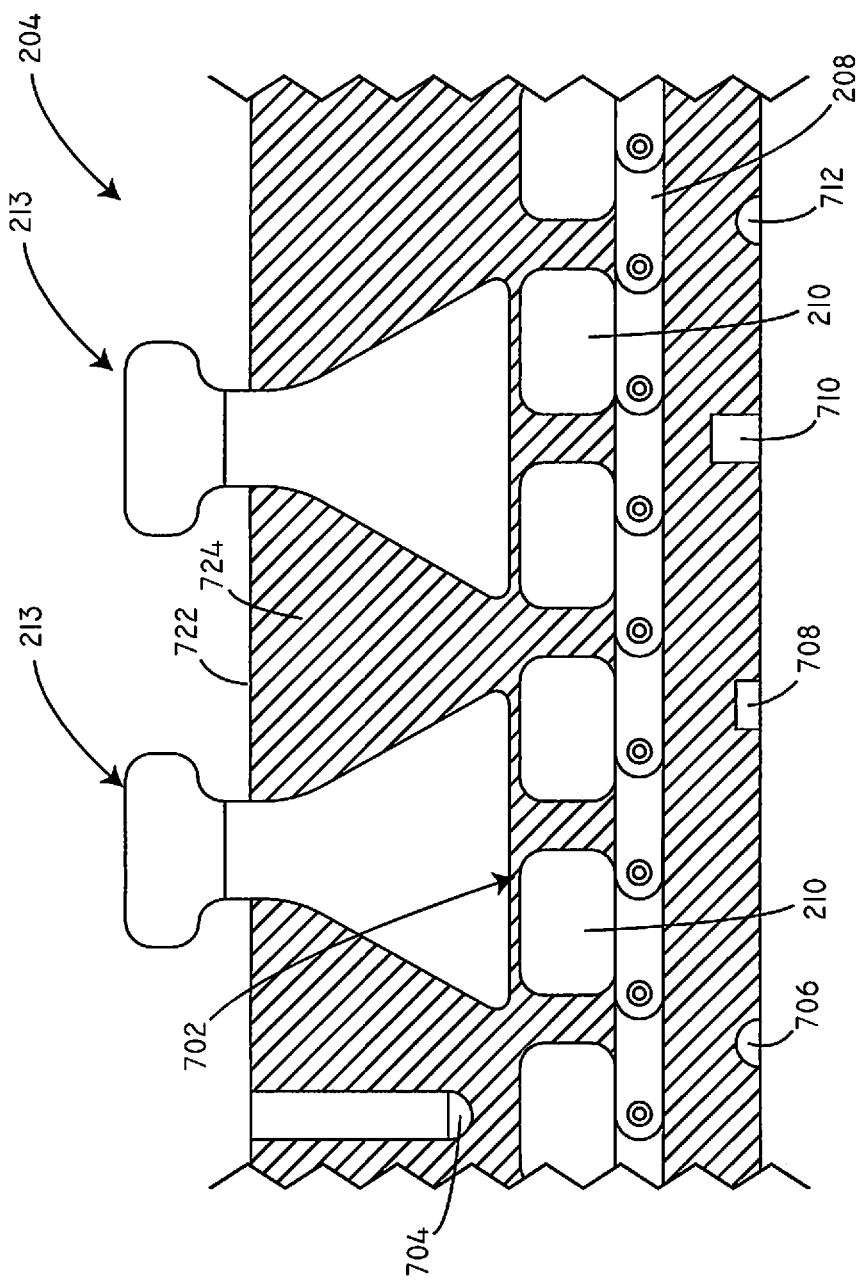
FIG. 7 is a schematic side view of a main microwave heating chamber in accordance with various embodiments herein.

Referring now to FIG. 7, a schematic side view of a portion of a main microwave heating chamber 204 in accordance with various embodiments herein is shown. The main microwave heating chamber 204 can include a housing 722 defining an interior volume 724. In various embodiments, the interior volume 724 can be filled, and in some cases completely filled, with a liquid 211. The main microwave heating chamber 204 can include one or more microwave units 213. The microwave units 213 can be oriented so as to deliver microwave energy to food products or flights of food products 210 that are moved through the main microwave heating chamber 204 via a product conveyor mechanism 208.

Various components can be disposed within or adjacent to the main microwave heating chamber. By way of example, the main microwave heating chamber 204 can include various sensors. As a specific example, the main microwave heating chamber 204 can include a proximity or distance sensor 704. The proximity or distance sensor 704 can be used to detect the distance to the food products or flights of food products 210. In some cases, this information can be used to regulate the dose of microwave energy delivered to the food products or flights of food products 210. In some cases, this information can be used to determine the presence of the food products or flights of food products 210. In some embodiments, a plurality of proximity or distance sensors can be included. In some embodiments the plurality of proximity or distance sensors can be connected to or otherwise associated with one or more microwave units or components thereof such as emitters, waveguides, horns, waveguide covers, etc.

In some embodiments, the main microwave heating chamber 204 can also include one or more of a temperature sensor 706, a pressure sensor 708, a microwave energy detector 710, and a sensor or sensor package to detect liquid status (such as pH, total dissolved solids, total suspended solids) or the like. Various other sensors can also be included such as, but not limited to, a deflection sensor, an infrared sensor, an optical sensor, a rotation sensor or the like.

Figure 8:
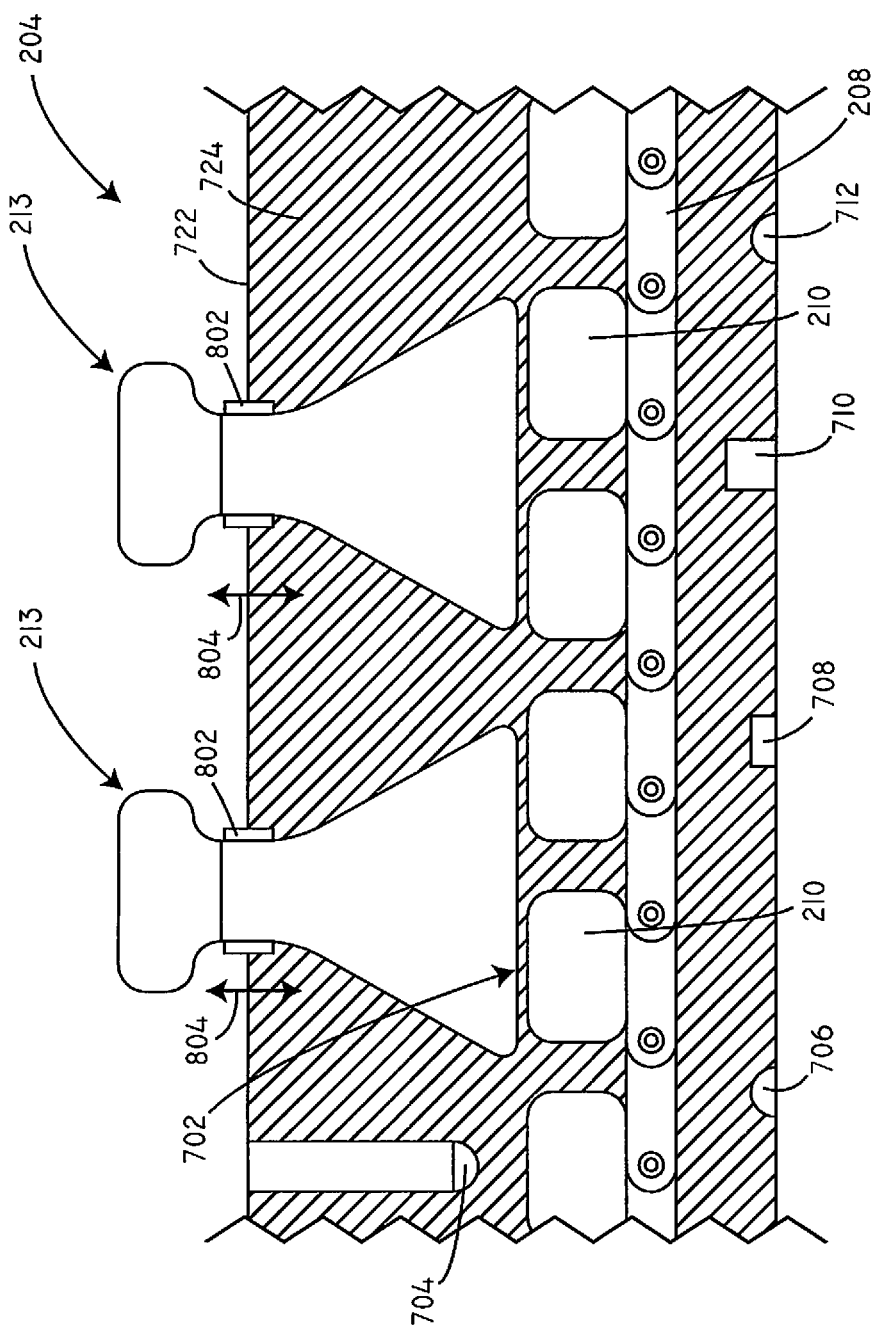
FIG. 8 is a schematic side view of a main microwave heating chamber in accordance with various embodiments herein.

If the liquid includes polar compounds (such as water) an amount of microwave energy will be absorbed the liquid itself. As such, the intensity of the microwave energy will be attenuated as it travels through the liquid. As such, the distance between the food product and the place where the microwave energy first enters the liquid (such as the nearest portion of microwave units 213) is one variable that can be regulated in order to achieve a desirable level of consistency. In some embodiments, the microwave units 213 or a portion thereof can be moved in order to achieve a high level of consistency of distance the microwave energy must travel through liquid before entering the food product. Referring now to FIG. 8, a schematic side view of a main microwave heating chamber in accordance with various embodiments herein is shown. The main microwave heating chamber 204 can include a housing 722 defining an interior volume 724. In various embodiments, the interior volume 724 can be filled, and in some cases completely filled, with a liquid 211. The main microwave heating chamber 204 can include one or more microwave units 213. The microwave units 213 can be oriented so as to deliver microwave energy to food products or flights of food products 210 that are moved through the main microwave heating chamber 204 via a product conveyor mechanism 208. Actuators 802 can be included that can cause movement of the microwave units 213 in the direction of arrows 804. As such, if a proximity or distance sensor 704 indicates a change in the distance of the food products relative to the microwave units 213 then the position of the microwave units 213 (or a distal portion thereof such as a distal portion of the waveguide) can be adjusted so as to maintain a desired distance that the microwave energy must travel through the liquid before entering the food product being processed. In another scenario, if the food products vary in size, as indicated by a sensor or through user input, then the position of the microwave units 213 can be adjusted so as to result in a greater or lesser amount of microwave energy entering the food product being processed. In some embodiments, the system can be configured so as to allow movement of a plurality of microwave units, or a component thereof, in synchrony with the movement of other microwave units. By way of example, the system can be configured to accept a command from a user or system subcomponent that can cause the movement of multiple microwave units.

Figure 9:
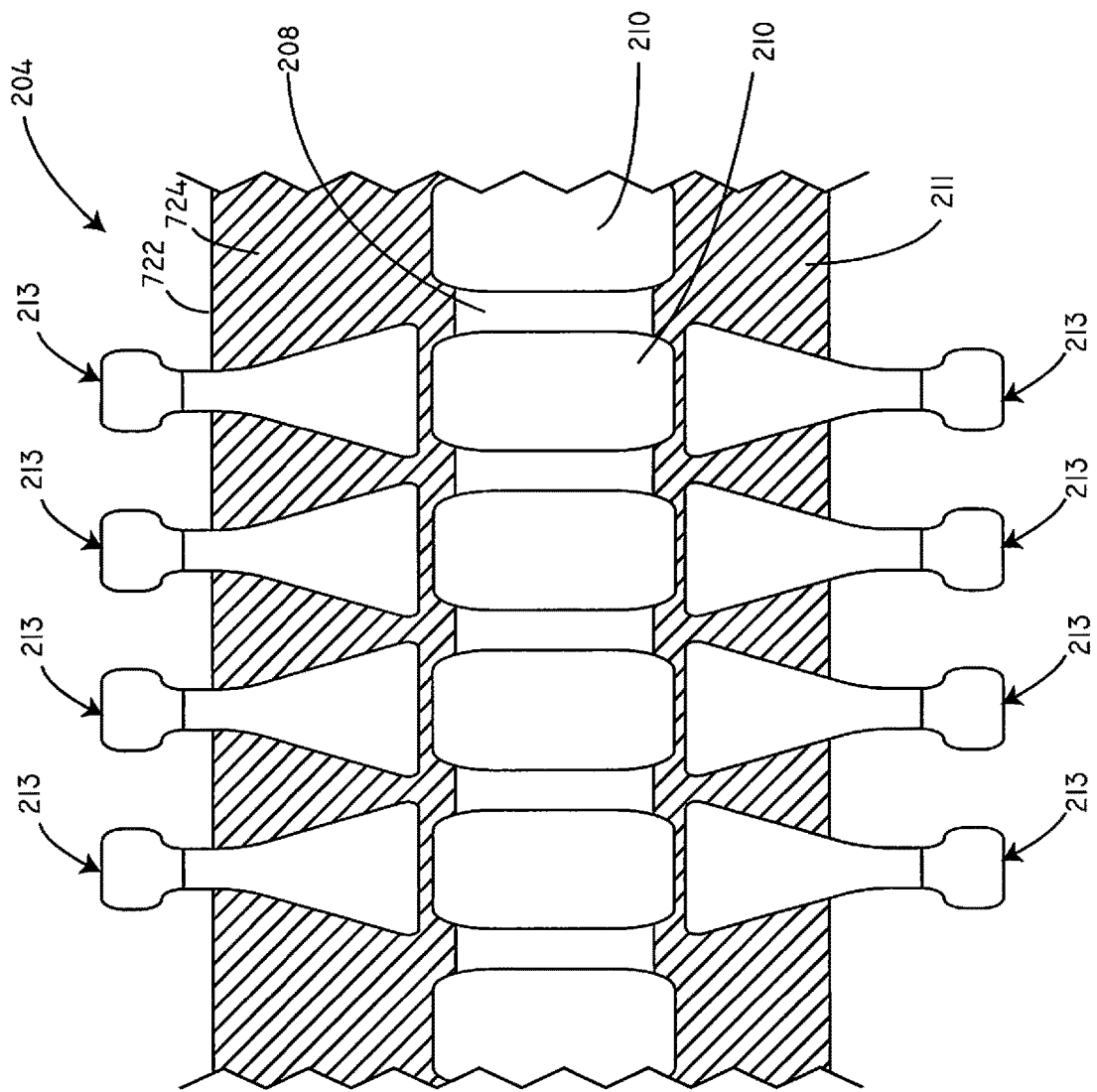
FIG. 9 is a schematic side view of a main microwave heating chamber in accordance with various embodiments herein.
Figure 15:
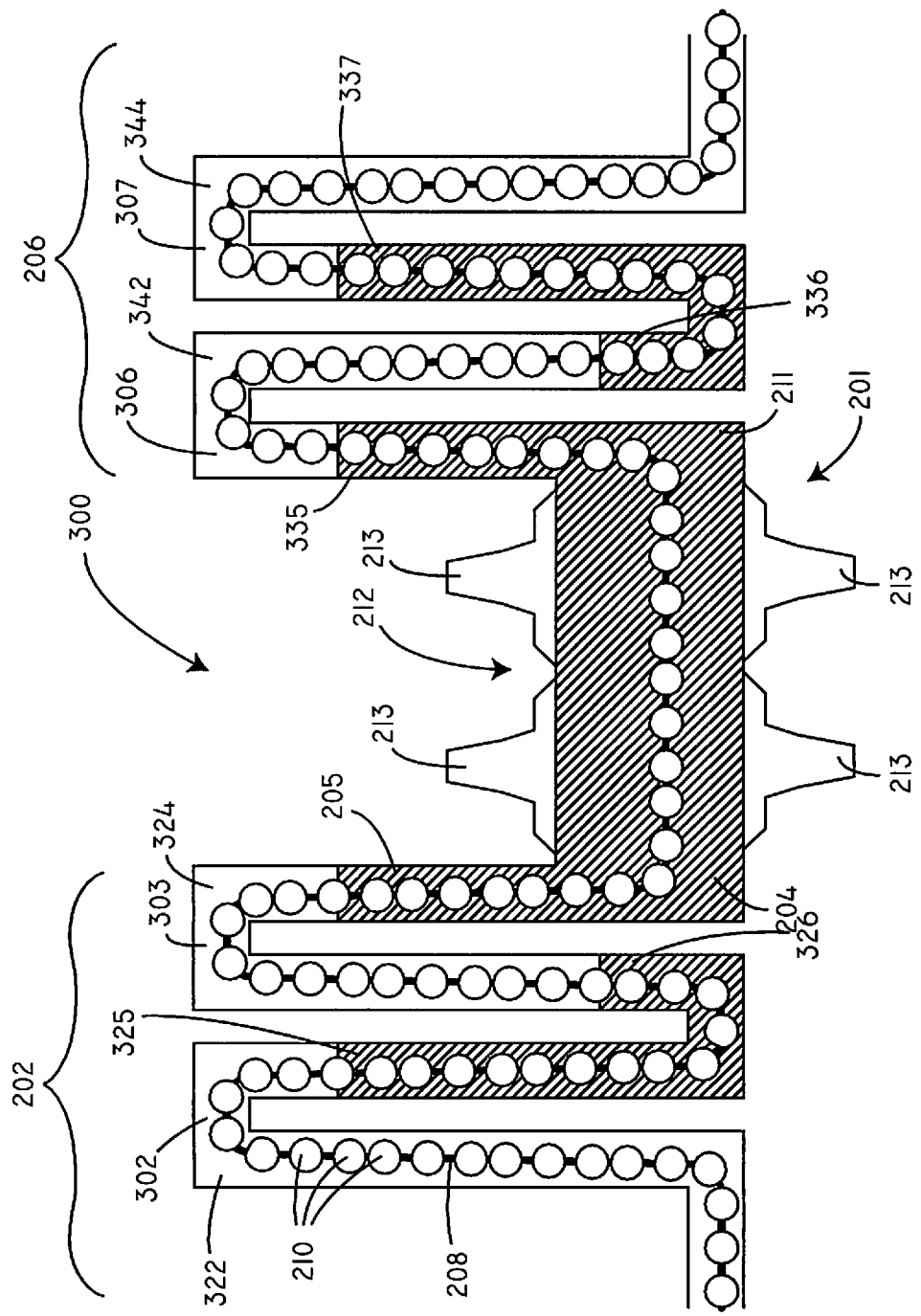
FIG. 15 is a schematic side view of a processing system in accordance with various embodiments herein.

Referring now to FIG. 9, a top view of a main microwave heating chamber 204 in accordance with various embodiments herein is shown. The main microwave heating chamber 204 can include a housing 722 defining an interior volume 724. In various embodiments, the interior volume 724 can be filled, and in some cases completely filled, with a liquid 211. The main microwave heating chamber 204 can include food products or flights of food products 210 attached to a product conveyor mechanism 208. The main microwave heating chamber 204 can include microwave units 213 to deliver microwave energy to the food products or flights of food products 210. In this case, the microwave units 213 are oriented on the sides of the main microwave heating chamber 204 and opposed to one another. However, as stated previously, the microwave units 213 (or portions thereof) can be disposed on any of the top, bottom or sides of the main microwave heating chamber 204. By way of example, in some embodiments the microwave units 213 can be opposed on the top and bottom of the microwave heating chamber. Referring now to FIG. 15, a schematic side view of a processing system is shown in accordance with various embodiments herein where the microwave units 213 are disposed in opposition on the top and bottom of the microwave heating chamber 204 (wherein the reference numbers in FIG. 15 correspond to the same components as described with respect to FIG. 3 discussed above).

Figure 10:
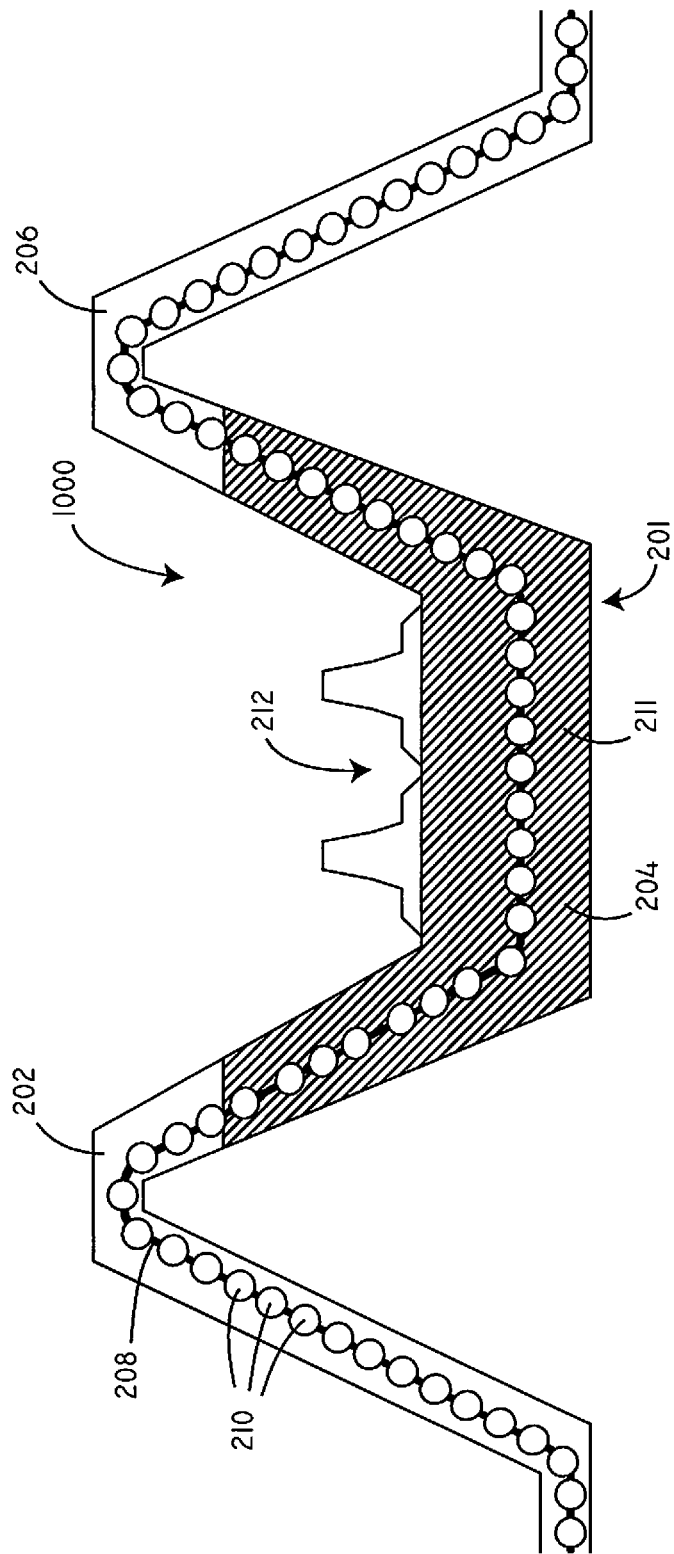
FIG. 10 is a schematic side view of a processing system in accordance with various embodiments herein.

It will be appreciated that references herein to passing food products vertically through a liquid column (upward or downward) does not require that such movement be purely vertical and that simultaneous horizontal movement can also occur unless stated otherwise. Referring now to FIG. 10 is a schematic side view of a processing system 1000 in accordance with various embodiments herein is shown. The processing system 1000 includes a continuous processing channel 201. The continuous processing channel 201 can include a come-up chamber or zone 202, a main microwave heating chamber or zone 204, and a cool-down chamber or zone 206. The come-up chamber 202 can be oriented for vertical product movement. In specific, the come-up chamber 202 can be oriented for vertical movement of food products 210 (or flights of food products) along a product conveyor mechanism 208 through the continuous processing channel 201 of the processing system 1000. In this embodiment, some portions of the system are angled such that vertical movement is also accompanied by horizontal movement. Food products 210 can be moved by the product conveyor mechanism 208 from the come-up chamber 202 and into the main microwave heating chamber 204. The main microwave heating chamber 204 can be filled with a liquid 211. Food products 210 can then be moved by the product conveyor mechanism 208 from the main microwave heating chamber 204 to the cool-down chamber 206.

Figure 11:
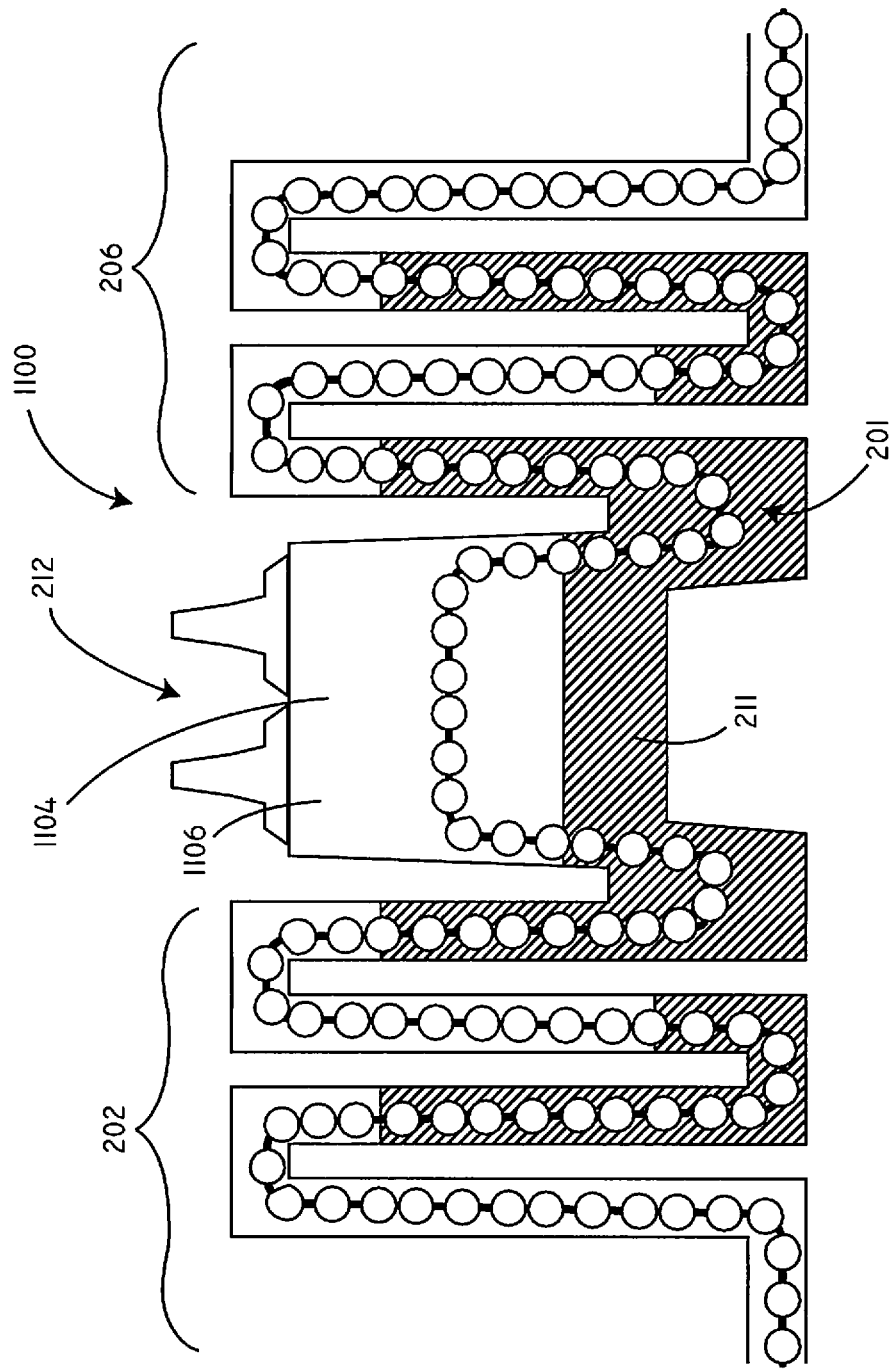
FIG. 11 is a schematic side view of a processing system in accordance with various embodiments herein.

In some embodiments, the main microwave heating chamber or zone may be only partially filled with a liquid. For example, a portion of the main microwave heating chamber can be filled with a liquid and a portion can be filled with a non-liquid, such as steam. Referring now to FIG. 11, a schematic side view of a processing system 1100 in accordance with various embodiments herein is shown. The processing system 1100 includes a continuous processing channel 201. The continuous processing channel 201 can include a come-up chamber or zone 202, a main microwave heating chamber or zone 1104, and a cool-down chamber or zone 206. The system 400 can also include a microwave energy emitting apparatus 212. The main microwave heating chamber or zone 1104 can be partially filled with a liquid 211. The main microwave heating chamber or zone 1104 can also include a portion 1106 that is not filled with a liquid. This portion 1106 can be filled with steam in some embodiments. In this embodiment, the food products or flights of food products can move upward within the main microwave heating chamber as they pass through. In other embodiments (such as other embodiments shown with reference to other figures) the food products or flights of food products can move horizontally through the main microwave heating chamber without substantial vertical movement.

Figure 12:
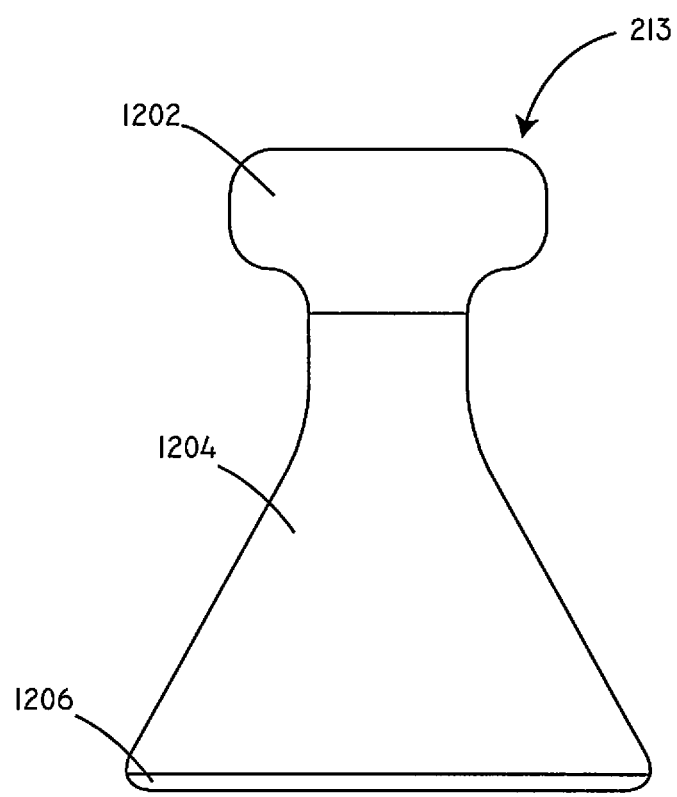
FIG. 12 is a schematic side view of a microwave unit in accordance with various embodiments herein.

Referring now to FIG. 12, a schematic side-view of a microwave unit 213 is shown in accordance with various embodiments herein. The microwave unit 213 can include a microwave generation segment 1202. The microwave generation segment 1202 can include components to generate microwaves such as a magnetron, RF power transistor, or similar electromagnetic wave emitting device. As an example of an RF power transistor, a laterally-diffused metal oxide semiconductor field-effect transistor (LDMOS-FET) can be used to generate microwave energy. The microwave unit 213 can also include a waveguide 1204. In some cases at least a portion of the waveguide 1204 can be referred to as a horn. In some embodiments, the waveguide 1204 can define an interior volume or channel comprising a distal end, the distal end of the channel hermetically sealed with a waveguide cover 1206 or window. The covers/windows may be single or may include multiple windows permanently mounted or adjusted to accommodate the microwave dampening effect as desired for the process. In some embodiments the interior volume or channel can be curved. In some embodiments the interior volume can be fluted (e.g., with interior baffles to facilitate appropriate carry of the wave to the target). In some embodiments, the interior volume defined by the waveguide 1204 can be a vacuum. In some embodiments, the interior volume defined by the waveguide 1204 can be filled with air. In some embodiments, the interior volume defined by the waveguide 1204 can be filled with a liquid that is substantially transparent to microwave energy, such as a nonpolar liquid.

Figure 13:
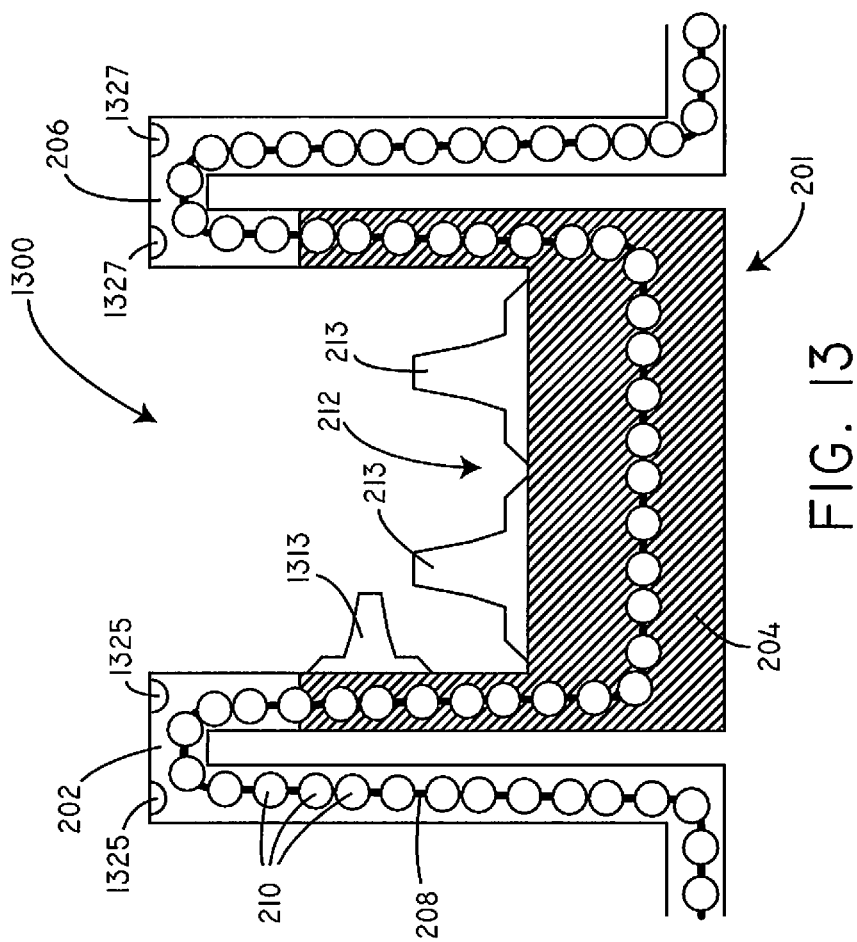
FIG. 13 is a schematic side view of a processing system in accordance with various embodiments herein.

In various embodiments, microwave units can be disposed in or on portions of the system other than the main microwave heating chamber. By way of example, in some embodiments, microwave units can be disposed in or on the come-up chamber. Referring now to FIG. 13, a schematic side view is shown of a processing system 1300 in accordance with various embodiments herein. The processing system 1300 includes a continuous processing channel 201. The continuous processing channel 201 can include a come-up chamber or zone 202, a main microwave heating chamber or zone 204, and a cool-down chamber or zone 206. The system 1300 can also include a microwave energy emitting apparatus 212 including microwave units 213. Food products 210 (or flights of food products) can be moved along a continuous processing channel 201 by a product conveyor mechanism 208. In this example, the come-up chamber 202 can also include one or more microwave units 1313. In addition, in some embodiments, the system 1300 can include one or more sensors 1325 (which can be of any type previously mentioned) in the come-up chamber 202. In addition, in some embodiments, the system 1300 can include one or more sensors 1327 (which can be of any type previously mentioned) in the cool-down chamber 206. Such sensors can, in some cases, be in addition to sensors in the main microwave heating chamber 204.

In some embodiments, the system can include containment devices such as baffles, deflectors, shielding, or the like to control where microwave energy travels. In some embodiments, the containment devices can be moveable in order to facilitate the optimization of processing of particular food package sizes, shapes, etc. For example, containment devices can be operatively connected to one or more actuators (hydraulic, pneumatic, electric, or the like) in order to cause them to move.

Figure 14:
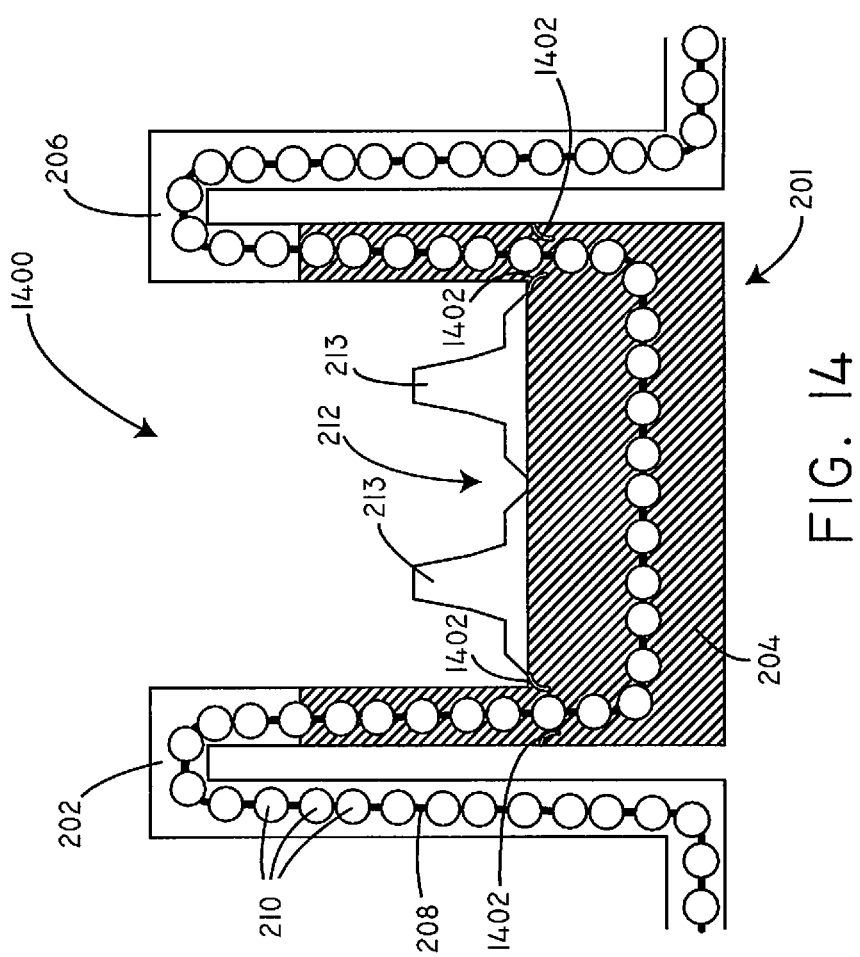
FIG. 14 is a schematic side view of a processing system in accordance with various embodiments herein.

Referring now to FIG. 14, a schematic side view is shown of a processing system 1400 in accordance with various embodiments herein. The processing system 1400 includes a continuous processing channel 201. The continuous processing channel 201 can include a come-up chamber or zone 202, a main microwave heating chamber or zone 204, and a cool-down chamber or zone 206. The system 1400 can also include a microwave energy emitting apparatus 212 including microwave units 213. Food products 210 (or flights of food products) can be moved along a continuous processing channel 201 by a product conveyor mechanism 208. In this example, the system 1400 can also include containment devices 1402. The containment devices 1402 can be flexible or rigid. The containment devices 1402 can be made of materials that absorb microwave energy and/or reflect microwave energy. The containment device 1402 can be shaped and positioned so that microwave energy stays in certain areas of the system 1400. By way of example, in some embodiments the containment devices can be shaped and/or positioned so as to keep microwave energy within the main microwave heating chamber 204.

Figure 16:
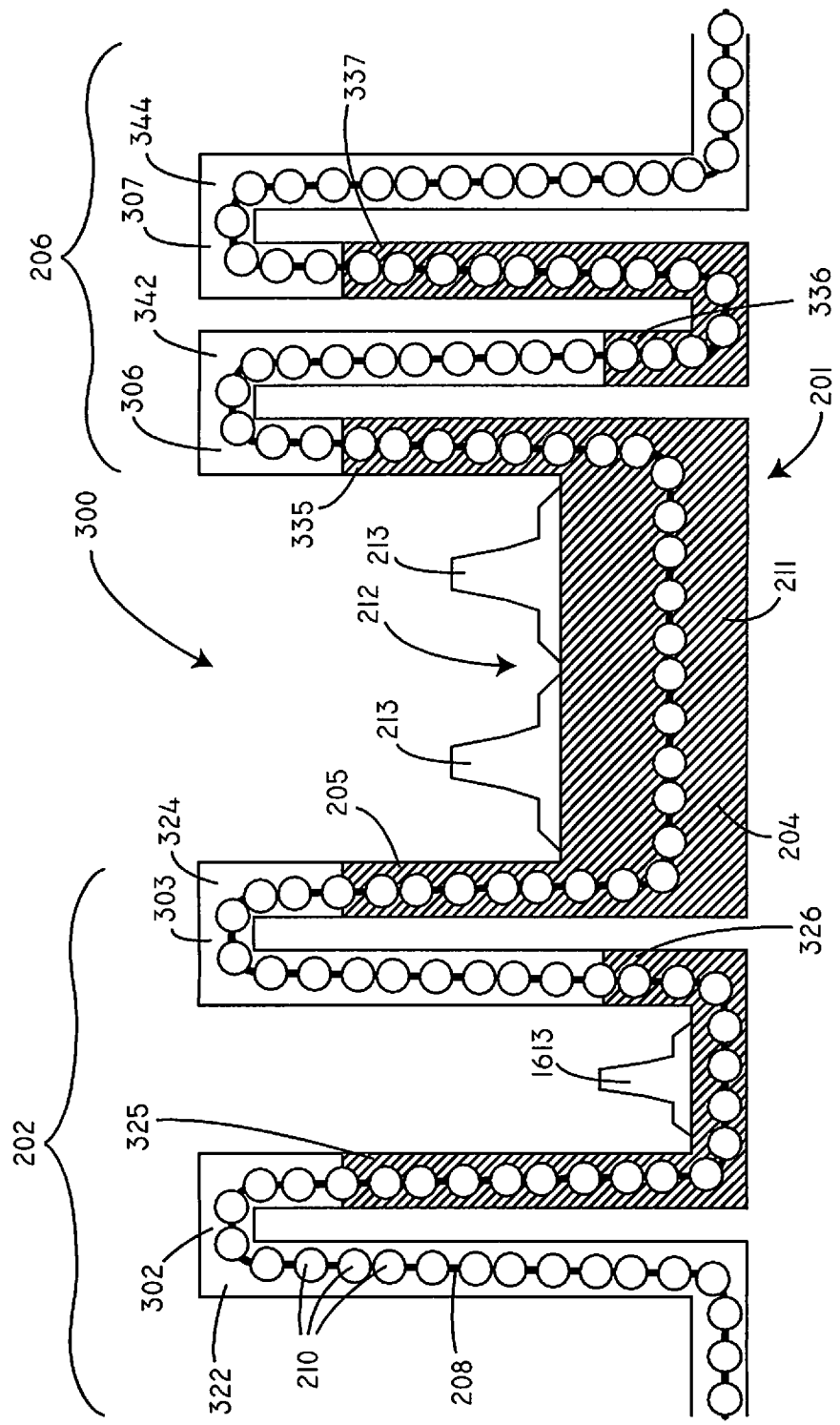
FIG. 16 is a schematic side view of a processing system in accordance with various embodiments herein.

It will be appreciated that in some embodiments that microwave or other electromagnetic wave energy can also be applied outside of the main heating chamber, such as in the come-up chamber or zone as a preheating mechanism. Referring now to FIG. 16 a schematic side view of a processing system is shown in accordance with various embodiments herein. In this view an electromagnetic wave (such as microwave) emitting unit 1613 can be positioned in the come-up chamber or zone 202 (the remaining reference numbers shown in FIG. 16 correspond to the same components as described with respect to FIG. 3 discussed above).

The housings used to form the various portions of the system described herein can be made of various materials including, but not limited to, metals, polymers, ceramics, composites, or the like. In some embodiments, the housings of at least some portions of the system herein are formed from stainless steel.

In addition to the different type of chambers described above, it will be appreciated that the system can also include other types of chamber or more than one of any of the types of chambers described above. By way of example, in some embodiments, the system can also include one or more holding chambers. Holding chamber(s) can be positioned in front of or behind of any of the other chambers of the system.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

The invention claimed is:

1. A food processing system comprising:
a housing defining a continuous processing channel divided into a come-up chamber, a main microwave heating chamber, and a cool-down chamber; the continuous processing channel defining at least two separate portions oriented for vertical product movement;
wherein the come-up chamber and the cool-down chamber are at least partially filled with an aqueous liquid;
wherein the main microwave heating chamber is completely filled with the aqueous liquid;
a product conveyor mechanism to convey food products to be processed continuously along a conveyance path passing from the come-up chamber through the main microwave heating chamber and to the cool-down chamber;
a plurality of retaining trays attached to the product conveyor mechanism, wherein each retaining tray is configured to hold a plurality of individual food containers laterally across each retaining tray;
a microwave energy emitting apparatus configured to emit microwave energy into the main microwave heating chamber;
a distance sensor disposed in the main microwave heating chamber to measure a distance to the food products;
a pressure sensor disposed in the main microwave heating chamber to measure pressure therein;
a microwave energy detector disposed in the main microwave heating chamber; and
an actuator to move the microwave energy emitting apparatus or a distal portion thereof, the actuator configured to adjust the position of at least the distal portion of the microwave energy emitting apparatus based on the distance to the food products measured by the distance sensor;
wherein an average pressure in the continuous processing channel changes along the conveyance path of the product conveyor mechanism;
wherein the microwave energy emitting apparatus comprising an array of microwave units.

2. The food processing system of claim 1, wherein an average temperature in the continuous processing channel changes along the conveyance path of the product conveyor mechanism.

3. The food processing system of claim 1, wherein the main microwave heating chamber is completely filled with the aqueous liquid at a pressure above 0 psig.

4. The food processing system of claim 1, wherein the maximum height of the aqueous liquid in the main microwave heating chamber is lower than the maximum height of the aqueous liquid in the come-up chamber and the cool-down chamber.

5. The food processing system of claim 1, wherein the come-up chamber, the main microwave heating chamber, and the cool-down chamber are in continuous fluid communication with one another.

6. The food processing system of claim 1, the microwave energy emitting apparatus comprising from 1 to 40 microwave units.

7. The food processing system of claim 6, the microwave units arranged in a grid pattern.

8. The food processing system of claim 1, the microwave energy emitting apparatus configured to emit energy at a frequency from 300 MHz to 2550 MHz.

9. The food processing system of claim 1, the microwave energy emitting apparatus configured to emit energy at a frequency of 915 MHz or 2450 MHz.

10. The food processing system of claim 1, wherein the microwave energy emitting apparatus emits energy at a first frequency of 915 MHz and a second frequency of 2450 MHz.

11. The food processing system of claim 1, the product conveyor mechanism forming a continuous loop.

12. The food processing system of claim 1, the food processing system configured to process the food products sufficiently to pasteurize the food products.

13. The food processing system of claim 1, the system food processing configured to process the food products sufficiently to sterilize the food products.

14. The food processing system of claim 1, wherein total dissolved solids and total suspended solids of the aqueous liquid is maintained within a predetermined range.

15. The food processing system of claim 1, the aqueous liquid having a total dissolved solids (TDS) concentration of between 1 mg/L and 1,500 mg/L.

16. The food processing system of claim 1, the aqueous liquid having a total suspended solids (TSS) concentration of between 100 mg/L and 1,500 mg/L.

17. The food processing system of claim 1, the aqueous liquid having a residual free chlorine, free bromine, or free iodine content of between 0.01 and 8 ppm.

18. The food processing system of claim 1, further comprising a containment device comprising a baffle configured to keep the microwave energy within the main microwave heating chamber, the baffle comprising a microwave absorbing material.

* * * * *